US012453815B2

(12) United States Patent
De Donatis et al.

(10) Patent No.: US 12,453,815 B2
(45) Date of Patent: Oct. 28, 2025

(54) DEVICE FOR CONNECTING A RESERVOIR TO A FLUID PATHWAY IN A MEDICAMENT DELIVERY APPARATUS

(71) Applicant: Stevanato Group S.p.A., Piombino Dese (IT)

(72) Inventors: Matteo De Donatis, Dübendorf (CH); Nadine Troes, Bülach (CH); Irio Calasso, Arth (CH); Andrea Capuano, Piombino Dese (IT)

(73) Assignee: STEVANATO GROUP S.P.A., Piombino Dese (IT)

( * ) Notice: Subject to any disclaimer, the term of this patent is extended or adjusted under 35 U.S.C. 154(b) by 781 days.

(21) Appl. No.: 17/805,258

(22) Filed: Jun. 3, 2022

(65) Prior Publication Data

US 2022/0387706 A1    Dec. 8, 2022

(30) Foreign Application Priority Data

Jun. 4, 2021 (IT) .......................... 102021000014615

(51) Int. Cl.
*A61M 5/162* (2006.01)
*A61M 5/14* (2006.01)
*A61M 5/145* (2006.01)

(52) U.S. Cl.
CPC .......... *A61M 5/162* (2013.01); *A61M 5/1413* (2013.01); *A61M 5/14566* (2013.01)

(58) Field of Classification Search
CPC .............. A61M 5/142; A61M 5/14244; A61M 5/14248; A61M 5/14566; A61M 5/162
See application file for complete search history.

(56) References Cited

U.S. PATENT DOCUMENTS

| 5,405,326 A | 4/1995 | Haber et al. |
| 7,780,636 B2 | 8/2010 | Radmer et al. |
| 2003/0073958 A1 | 4/2003 | Pond |

(Continued)

FOREIGN PATENT DOCUMENTS

| WO | 2019032374 A1 | 2/2019 |
| WO | 2019038751 A1 | 2/2019 |
| WO | 2020128821 A1 | 6/2020 |

OTHER PUBLICATIONS

European Search Report Mar. 21, 2025 for corresponding European Application No. 22176680.1.

*Primary Examiner* — Laura A Bouchelle
(74) *Attorney, Agent, or Firm* — Husch Blackwell LLP

(57) ABSTRACT

A device for connecting a reservoir to a fluid pathway in a medicament delivery apparatus includes a main body having a service area housing a needle in fluid communication with the fluid pathway. A reservoir is filled with a medicament to be delivered in the fluid pathway through the needle after the latter has pierced an end surface of the reservoir. A plunger is movable within the reservoir along an axial direction parallel to a longitudinal axis of the reservoir, and a piston is movable along said axial direction. A trigger mechanism is configured to drive the device to move from an initial operative configuration at which the axial movement of the piston causes an axial movement of the reservoir with respect to the main body to a final operative configuration at which the axial movement of the piston causes an axial movement of the plunger within the reservoir.

16 Claims, 11 Drawing Sheets

(56) References Cited

U.S. PATENT DOCUMENTS

| | | |
|---|---|---|
| 2018/0028747 A1 | 2/2018 | Hanson et al. |
| 2019/0111207 A1* | 4/2019 | Salter .................... A61M 5/158 |
| 2020/0009315 A1 | 1/2020 | Brouet et al. |
| 2020/0121848 A1 | 4/2020 | Schmidlin et al. |
| 2020/0155759 A1 | 5/2020 | Hanson et al. |

* cited by examiner

DEVICE FOR CONNECTING A RESERVOIR TO A FLUID PATHWAY IN A MEDICAMENT DELIVERY APPARATUS

CROSS REFERENCES

This application claims priority to Italian Application No. 102021000014615 filed on Jun. 4, 2021, the disclosure of which is expressly incorporated by reference herein in its entirety.

TECHNICAL FIELD

The present invention relates to a device for connecting a reservoir to a fluid pathway in a medicament delivery apparatus.

BACKGROUND

In the present description and in the subsequent claims, the expression "fluid pathway" is used to refer to any element or assembly configured to be connected, at a first end thereof, to the reservoir of a medicament delivery apparatus and, at an end opposed to said first end thereof, to the body of a patient, in order to allow the passage of a medicament from the reservoir to the body of the patient.

The device of the invention finds a preferred application in any medicament delivery apparatus in which the reservoir is pre-filled with the medicament to be delivered, said reservoir being sealed and housed in the medicament delivery apparatus during the manufacturing and/or assembling of the latter to be subsequently connected to the fluid pathway only when it is desired to dispense to the patient the medicament provided in the reservoir.

The insertion of the sealed reservoir into the medicament delivery apparatus can be performed either directly by the manufacturer of the delivery apparatus or by a user, e.g. a doctor or nurse or the patient him/herself.

Medicament delivery apparatuses suitable to comprise the device of the invention are, preferably, pumping apparatuses wearable by the patient and configured to be connected to the patient's body by, for example, a catheter, or by one or more micro-needles which may be made of different materials, or by a needle or cannula, or pumping apparatuses implantable in the patient's body, or delivery apparatuses of the injection type which deliver the medicament into the subcutaneous part of the skin either intramuscularly or intravenously.

An example of a medicament delivery apparatus suitable to comprise the device of the invention is described in WO 2020/128821A1.

In all the apparatus discussed above, it is essential that the reservoir remains sealed, and therefore disconnected from the fluid pathway, until just before the time of dispensing to the patient the medicament provided in the reservoir. To this end, it is known to provide such apparatuses with suitable mechanisms to allow the connection of the reservoir to the fluid pathway only shortly before the time of the aforesaid dispensing.

Examples of such mechanisms are described in US 2020/0155759A1, US 2018/0028747A1, U.S. Pat. No. 7,780,636B2, WO 2019/038751A1. These mechanisms require the piercing of a reservoir surface (typically comprising a septum or a pierceable membrane) by a needle connected to the fluid pathway. This piercing takes place by moving the needle towards the reservoir.

The Applicant sought an alternative solution to those currently known to allow the reservoir to be connected to the fluid pathway only when it is desired to dispense to the patient the medicament provided in the reservoir.

The Applicant has observed that typically in medicament delivery apparatuses, after the reservoir has been fluid-dynamically connected to the fluid pathway following the piercing of the reservoir by the needle, the dispensing of the medicament from the reservoir to the patient's body via the fluid pathway occurs by the effect of the thrust exerted on the medicament provided within the reservoir by a piston suitably moved by the user or by a motor specifically provided in the medicament delivery apparatus. In particular, this piston pushes a plunger arranged inside the reservoir and slidably coupled to the inner surface of the reservoir, the plunger in turn pushes the medicament to be delivered.

The Applicant thought to exploit the movement of the piston not only to dispense to the patient the medicament provided in the reservoir, but also to create the fluid-dynamic connection between the reservoir and the fluid pathway when it is desired to start the therapy by dispensing to the patient the medicament provided in the reservoir.

The Applicant realised that the movement of the plunger can be exploited initially to move the reservoir towards the needle so as to pierce the reservoir and achieve the fluid-dynamic connection between the reservoir and the fluid pathway and, subsequently, to push the plunger towards the needle, thereby pushing the medicament contained inside the reservoir towards the fluid pathway and thus towards the patient's body.

SUMMARY OF THE DISCLOSURE

The Applicant has therefore provided a mechanism capable of converting the movement of the plunger initially into a movement of the reservoir towards the needle and subsequently into a movement of the plunger towards the needle. This mechanism allows the selective transition from an initial operative configuration in which the movement of the piston causes the fluid-dynamic connection between the reservoir and the fluid pathway, and a final operative configuration in which the movement of the piston causes a passage of the medicament from the reservoir into the fluid pathway.

The present invention therefore relates, in a first aspect thereof, to a device for connecting a reservoir to a fluid pathway in a medicament delivery apparatus, comprising:
  a main body having a service area configured to house a needle in fluid communication with a fluid pathway;
  a reservoir extending along a longitudinal axis and housed within the main body, the reservoir being filled with a medicament to be delivered in the fluid pathway through the needle and comprising an end surface configured to be pierced by the needle and a plunger movable within the reservoir along an axial direction parallel to said longitudinal axis;
  a piston movable along said axial direction;
  characterised in that it comprises a trigger mechanism configured to drive the device to move from an initial operative configuration at which the axial movement of the piston causes an axial movement of the reservoir with respect to the main body to a final operative configuration at which the axial movement of the piston causes an axial movement of the plunger within the reservoir.

In the present description provided below and in the subsequent claims, the term "axial" or "axially" is used to refer to a direction substantially parallel to the longitudinal axis of the reservoir, which corresponds to both the direction of extension of the needle piercing the septum of the reservoir and the direction of advancement of the piston towards and into the reservoir.

Instead, the term "radial" or "radially" is used to refer to any direction which is transversal to the aforementioned longitudinal axis. In particular, "radially outer" means a position farther from the aforementioned longitudinal axis than the position of a reference element, while "radially inner" means a position closer to the said longitudinal axis than the position of a reference element. Accordingly, "radially outwardly" means a direction directed away from said longitudinal axis starting from said reference element, whereas "radially inwardly" means a direction directed towards said longitudinal axis starting from said reference element.

Thus, in the device of the present invention both the fluid-dynamic connection between the reservoir and the fluid pathway and the dispensing to the patient of the medicament provided inside the reservoir are achieved as a direct or indirect effect of the axial movement of the piston. In fact, thanks to the provision of the aforementioned trigger mechanism, the axial movement of the piston initially causes the axial movement of the reservoir with respect to the main body and then the axial movement of the plunger inside the reservoir. The above mechanism thus permits the selective transition from an initial operative configuration in which the movement of the piston causes the fluid-dynamic connection between the reservoir and the fluid pathway, and a final operative configuration in which the movement of the piston causes a passage of the medicament from the reservoir into the fluid pathway.

The main body of the device of the present invention is, preferably, fixedly associated with a part of the medicament delivery apparatus, more preferably fixedly associated with a part of the outer casing of the latter. This main body may be a body separate from said outer casing and fixedly mounted within said outer casing or a body made in one piece with said outer casing.

The delivery apparatus may be of the disposable type, in which case all the components of the apparatus are contained in said outer casing, or of the at least partially reusable type, in which case the activation and control electronics of the apparatus are contained in a part of the apparatus associated with said outer casing and reusable.

Preferably, in order to prevent the risk of delivering doses other than those desired, when the device is at said initial operative configuration the axial movement of the piston does not also cause the axial movement of the plunger inside the reservoir. Similarly, when the device is at said final operative configuration, the axial movement of the piston does not also cause the axial movement of the reservoir with respect to the main body. In this way, the reservoir maintains a fixed axial position during the delivery of the drug and, once the piston is in contact with the plunger, a predetermined axial displacement of the piston corresponds to a corresponding predetermined axial displacement of the plunger and, therefore, to the delivery of a predetermined dose of medicament.

Preferably, the main body comprises, at said service area, an axial abutment surface. This axial abutment surface can be made in one piece with the main body or defined by a piece separate from the main body and mounted in the main body.

More preferably, when the device is at said initial operative configuration, the axial movement of the piston causes the axial movement of the reservoir from a distal position with respect to said axial abutment surface to a proximal position with respect to said axial abutment surface.

Preferably, when the device is at said final operative configuration the reservoir is at said proximal position.

In preferred embodiments of the invention, when the device is at said final operative configuration the reservoir abuts against said axial abutment surface.

The axial abutment between the reservoir and the axial abutment surface defines, in a constructively and functionally simple manner, the time at which the device of the invention passes from its initial operative configuration to its final operative configuration. In the latter operative configuration, any axial displacement of the reservoir is prevented and therefore the axial movement of the piston generates an axial thrust only on the plunger inside the reservoir, ensuring that exactly the desired dose of medicine is delivered.

In some preferred embodiments of the invention, axial movement of the reservoir is achieved by a thrusting action exerted by the piston on a thrusting member.

Various preferred embodiments of this thrusting member are foreseen.

In some preferred embodiments of the invention, the thrusting member is arranged between the piston and the reservoir when the device is at its initial operative configuration and is not arranged between the piston and the plunger when the device is at its final operative configuration.

In other preferred embodiments of the invention, the thrusting member is arranged between the piston and the reservoir when the device is at its initial operative configuration and is arranged between the piston and the plunger when the device is at its final operative configuration.

In first particularly preferred embodiments of the invention, the thrusting member is engaged with the piston when the device is at said initial operative configuration and is operatively disengaged from the piston when the device is at said final operative configuration.

In this case, preferably, the thrusting member moves integrally with the piston and the reservoir when the device is at said initial operative configuration and remains solidly fixed to the main body when the device is at said final configuration. Therefore, when the device is at said initial operative configuration, the piston axially pushes the thrusting member, which in turn axially pushes the reservoir, whereas when the device is at said final operative configuration, the piston goes beyond the thrusting member, enters the reservoir and pushes the plunger.

Preferably, the thrusting member becomes solidly fixed to the main body when the reservoir abuts against the axial abutment surface.

In some preferred embodiments thereof, the thrusting member has an annular shape.

In such a case, preferably, when the device is at said final operative configuration, during its axial movement the piston passes in a radially inward position with respect to the thrusting member to enter the reservoir and abut against the plunger.

In particularly preferred embodiments of the invention, the main body comprises at least one seat.

In such a case, preferably, the thrusting member comprises at least one pushing element arranged between the piston and the reservoir when the device is at said initial operative configuration and housed into said at least one seat when the device is at said final operative configuration. The transition from the initial operative configuration to the final operative configuration takes place precisely when the thrusting member, initially pushed by the piston, reaches the aforementioned at least one seat, remaining locked therein and no longer being arranged between the piston and the reservoir.

Preferably, the thrusting member reaches said at least one seat when the reservoir abuts against the axial abutment surface.

Preferably, said at least one seat comprises two seats arranged on opposite sides with respect to the longitudinal axis and projecting radially outwardly with respect to said main body.

In such a case, preferably, said at least one pushing element comprises two pushing elements arranged within the main body on opposite sides with respect to the longitudinal axis, said two pushing elements being close to each other and arranged out of said two seats when the device is at said initial operative configuration, and spaced apart from each other and locked in said two seats when the device is at said final operative configuration. Thus, when said two pushing elements are close to each other, they are arranged between the piston and the reservoir, so that during its axial movement the piston exerts an axial thrust on these pushing elements and, through them, on the reservoir. On the other hand, when the aforementioned two pushing elements are spaced apart and locked in the aforementioned seats, they are no longer arranged between the piston and the reservoir, so that the piston, continuing its axial movement, goes beyond these pushing elements, enters the reservoir and exerts an axial thrust on the piston inside the reservoir.

Preferably, the piston has a frustoconical shape.

Preferably, at least one of said at least two pushing elements comprises a ramp configured to cooperate with the piston when the device is at said initial operative configuration. This ramp is configured to convert the axial thrust of the piston into an axial thrust of the pushing elements on the reservoir when the device is at its initial operative configuration and into a radial movement of the two pushing elements when they reach their respective seats provided on the main body, allowing the locking of the two pushing elements into their respective seats and the transition of the device from its initial operative configuration to its final operative configuration.

Preferably, the main body comprises an axial slot extending from each of said two seats to a respective free end of the main body opposite said service area.

More preferably, each of said two pushing elements comprises a hook portion housed in a respective axial slot when the device is at said initial operative configuration and locked in a respective seat when the device is at said final operative configuration. This hook portion prevents the two pushing elements from approaching each other when the piston, after going beyond them, enters the reservoir to push the plunger inside the reservoir.

In some of the preferred embodiments thereof, the thrusting member also comprises a ring slidingly fitted onto the main body and at least one elastically bendable arm connecting the ring to a respective pushing element.

In this case, preferably, the thrusting member is designed so that, at rest, the two elastically bendable arms tend to hold the two pushing elements in a mutually spaced apart position.

Preferably, when the ring is fitted to the main body and the device is at its initial operative configuration, the elastically bendable arms are housed at least partially in their respective axial slots and the two pushing elements are arranged inside the main body. In this case, the two elastically bendable arms are pushed towards each other by the main body. The axial movement of the piston causes the aforementioned ring, and therefore the thrusting member and the reservoir, to slide axially with respect to the main body until the two pushing elements reach their respective seats formed on the main body. At this point, the elastic action exerted by the elastically bendable arms on the two pushing elements facilitates the housing of the two pushing elements in the respective seats and the device passes into its final operative configuration.

In other preferred embodiments of the thrusting member, the at least one pushing element is defined at a free end of an elastic portion of a sliding element which is arranged between the reservoir and the main body and which is axially movable together with the reservoir when the device is at said initial operative configuration. In this operative configuration the piston axially pushes the sliding element, which in turn axially pushes the reservoir. The transition from the initial operative configuration of the device to the final operative configuration of the device takes place when the aforesaid pushing element reaches at least one seat and is housed therein.

Also in this case, preferably, the pushing element reaches the aforesaid at least one seat when the reservoir abuts against the axial abutment surface.

At rest, the elastic portion is essentially parallel to the longitudinal axis of the main body. The housing of the aforementioned free end in the aforementioned at least one seat takes place due to the thrust of the piston on the sliding element.

In further preferred embodiments thereof, the thrusting member comprises a ring connected to the piston by at least one connecting element which is configured to break when an axial force exerted by the piston on the reservoir is greater than a predetermined threshold.

Preferably, this threshold is reached when the reservoir abuts against the axial abutment surface and the piston continues to move along the axial direction.

Preferably, the ring is always in axial abutment against the reservoir. Before the breakage of said at least one connecting element, the axial movement of the piston generates a thrusting force of the ring on the reservoir and thus the axial movement of the reservoir. After the breakage of said at least one connecting element, the axial movement of the piston causes the movement of the piston inside the ring, the entry of the piston inside the reservoir and the axial thrust by the piston on the plunger provided inside the reservoir. The breakage of the aforesaid at least one pushing element causes the transition of the device from its initial operative configuration to its final operative configuration.

Preferably, a plurality of connecting elements is provided.

More preferably, these connecting elements are circumferentially equidistant from each other, so that they are all subjected to the same axial force and break as much as possible at the same time.

In other preferred embodiments of the invention, the thrusting member comprises a ring having at least one bendable fin projecting radially inwardly from said ring and configured to bend when an axial force exerted by the piston on the reservoir is greater than a predetermined threshold.

Preferably, this threshold is reached when the reservoir abuts against the axial abutment surface and the piston continues to move along the axial direction.

Also in this case, preferably, the ring is always in axial abutment against the reservoir. Before the bending of said at least one fin, the axial movement of the piston generates a thrusting force of the ring on the reservoir and thus the axial movement of the reservoir. After the bending of said at least one fin, the axial movement of the piston causes the movement of the piston inside the ring, the entry of the piston inside the reservoir and the axial thrust by the piston on the plunger provided inside the reservoir. The bending of said at least one fin causes the transition of the device from its initial operative configuration to its final operative configuration.

Preferably a plurality of bendable fins is provided.

More preferably, such bendable fins are circumferentially equally spaced from each other, so that they are all subjected to the same axial force and bend as much as possible at the same time.

In the above-described preferred embodiments of the invention, the thrusting member is arranged out of the reservoir, in particular between the piston and the reservoir, when the device is at said initial operative configuration, and remains arranged out of the reservoir when the device passes to said final operative configuration and the piston enters the reservoir to push the plunger.

In other preferred embodiments of the invention, the thrusting member is arranged outside the reservoir, in particular between the piston and the reservoir, when the device is at said initial operative configuration, whereas it enters inside the reservoir and it is arranged between the piston and the plunger when the device is at said final operative configuration.

In this case, preferably, the thrusting member is a bi-stable pushing element having, at a first shape configuration thereof, an outer diameter greater than the inner diameter of the reservoir and, at a second shape configuration thereof, an outer diameter smaller than the inner diameter of the reservoir.

Preferably, when the device is at its initial operative configuration the bi-stable pushing element is at the first shape configuration thereof, and when the device is at its final operative configuration the bi-stable pushing element is at the second shape configuration thereof.

Preferably, the bi-stable pushing element passes from the first shape configuration thereof to the second shape configuration thereof when an axial force exerted by the piston on the bi-stable pushing element is greater than a predetermined threshold.

Preferably, this threshold is reached when the reservoir abuts against the axial abutment surface and the piston continues to move along the axial direction.

More preferably, the bi-stable pushing element comprises a central portion substantially orthogonal to said longitudinal axis, a radially outer portion connected to the central portion and movable between an expanded position at which the bi-stable pushing element is at the first shape configuration thereof and a retracted position at which the bi-stable pushing element at in the second shape configuration thereof.

Preferably, the bi-stable pushing element further comprises a thrusting portion parallel to the central portion and connected to the latter by the radially outer portion.

Preferably, the radially outer portion comprises at least two articulated arms arranged on opposite sides with respect to the longitudinal axis and movable between a first position at which the radially outer portion is at its expanded position and the thrusting portion is spaced apart from the central portion, and a second position at which the radially outer portion is at its retracted position and the thrusting portion is adjacent to said central portion, possibly in abutment against said central portion. The piston, when moved axially, always acts in thrust on the aforesaid thrusting portion, both when the device is at its initial operative configuration and when the device is at its final operative configuration. When the axial force exerted by the piston on the thrusting portion exceeds the predetermined threshold—and this preferably occurs when the reservoir abuts against the axial abutment surface and the piston continues to move along the axial direction—the axial thrust of the piston causes the movement of the aforesaid at least two articulated arms from their first position to their second position. At this point, the axial movement of the piston causes the insertion of the bi-stable pushing element into the reservoir and an axial thrust on the plunger.

In other preferred embodiments of the invention, no thrusting member is provided between the piston and the reservoir and the piston pushes the plunger also when the device is at its initial operative configuration and before the reservoir is pierced. In this case, the axial movement of the piston causes an axial movement of the reservoir due to the thrust exerted on the reservoir by the medicament subjected to the thrusting action exerted by the piston through the plunger. Suitable expedients are envisaged to ensure that after the reservoir has been pierced by the needle, the reservoir immediately abuts against the axial abutment surface in order to prevent that, during the axial movement of the reservoir, any delivery of the medicament inside the reservoir, such a delivery being generated by an axial thrust exerted by the piston on the plunger, but not foreseen by the therapy regime, takes place.

In such a case, preferably, the trigger mechanism comprises a spring arranged in a radially outer position with respect to the piston between a fixed element and a movable element, a flange arranged in a radially inner position with respect to the reservoir and having a ramp portion and a trigger element arranged in a radially outer position with respect to the flange and to a second portion of the reservoir and having a shaped portion.

Preferably, when the device is at said initial operative configuration the spring is preloaded, a first portion of the trigger element axially abuts against the movable element and the shaped portion of the trigger element is arranged between said main body and said ramp portion, whereas when the device is at said final operative configuration, the trigger element is radially moved away from said flange so that the spring is at least in part released, the movable element abuts against the ramp portion and pushes the flange along the axial direction.

In all the embodiments of the invention described above, a spacer element may be provided inside the reservoir, between the plunger and the piston, to prevent or limit the plunger from being able to move backwards, i.e. towards the piston, for example during sterilisation cycles, due to a reduction in pressure generated inside the reservoir, as for example in the case of sterilisation using gases such as ETO (ethylene oxide) and NO2 (nitrogen dioxide). Such movement of the plunger would be undesirable as it could lead to contamination of the medicament in the reservoir, which could come into contact with molecules of the sterilisation gas.

In all cases where a thrusting member is provided between the piston and the reservoir, it is ensured that this thrusting member is prevented from moving towards the piston. In such a case, in order to prevent the backward thrust exerted by the plunger on the spacer element from affecting the piston, the thrusting member is at least partially arranged between the spacer element and the piston.

The spacer element can be made of a material with a coefficient of friction with the reservoir higher than that of the plunger.

Preferably, in all the embodiments of the invention described above, the device of the invention further comprises connecting members configured to push the reservoir against said axial abutment surface, so as to ensure the axial abutment between the reservoir and the axial abutment surface and to maintain such axial abutment during delivery of the medicament. It is advisable for the reservoir to be stationary during the delivery of the medicament to ensure that the axial thrust of the piston causes only the axial movement of the plunger and thus the desired dose of medicament to be dispensed.

The provision of the aforementioned connecting members is also advantageous in order to guarantee the axial abutment between the reservoir and the axial abutment surface taking into account possible dimensional tolerances in the manufacture of the reservoir and the main body.

In first embodiments of the invention, said connecting members comprise a first magnetic element connected to the main body at said service area and a second magnetic element connected to a free end portion of the reservoir faced towards said service area. In this case, the axial abutment between the reservoir and the axial abutment surface is achieved by the mutual magnetic attraction of the two magnetic elements when the reservoir is close to the axial abutment surface, this attraction increasing as the distance between the reservoir and the axial abutment surface decreases.

In such a case, the device may also comprise a Hall effect sensor magnetically connected to said first magnetic element and to said second magnetic element. This sensor allows the movement of the reservoir inside the main body to be tracked.

In alternative embodiments of the invention, said connecting members comprise elastic elements which cooperate with the components of the device of the invention or are defined at elastic portions of such components.

For example, in the embodiment in which the sliding element is used as a thrusting member for the reservoir, said connecting members comprise an elastically yielding hook portion associated with one of the sliding element and the main body and a hook element associated with the other between the sliding element and the main body and configured to elastically deform said hook portion when an axial force exerted by the piston on the reservoir is greater than a predetermined threshold.

Preferably, this threshold is reached shortly before the device reaches its final operative configuration and, in particular, when the force exerted by the hook element on the hook portion is such as to deform said hook portion with respect to its original shape.

Preferably, after being deformed, the hook portion returns to its original shape, generating, upon contacting the hook element, an axial force component that pushes the reservoir towards the service area, and in particular against the axial abutment surface. The axial abutment between the reservoir and the axial abutment surface is maintained by the coupling between the hook portion and the hook element.

In other embodiments of the invention, said connecting elements comprise a hinge element having two arms arranged on opposite sides with respect to a hinge axis, a sliding element fixedly coupled to the reservoir and a spring associated with a first arm of said two arms.

Preferably, the hinge element is movable about the hinge axis between a first operative position at which the other of said two arms abuts against a first portion of the sliding element and the spring is not loaded and a second operative position at which the other of said two arms is moved away from the first portion of the sliding element and the spring has been loaded and is arranged between the first arm and a second portion of the sliding element radially projecting outwardly.

In a second aspect thereof, the invention relates to a medicament delivery apparatus comprising a device in accordance with the first aspect of the present invention.

Such an apparatus therefore has all the advantages described above with reference to the device of the present invention and enables all the technical effects mentioned above to be achieved.

BRIEF DESCRIPTION OF THE DRAWINGS

Further characteristics and advantages of the present invention will become clearer from the following detailed description of preferred embodiments thereof, made with reference to the attached drawings and provided in an indicative and non-limiting way. In such drawings:

FIGS. 8a and 8b are schematic views, perspective and longitudinal section, respectively, of a further alternative embodiment of the device of the present invention at one of the operative configurations thereof, the section being taken in the plane whose trace is indicated by A in FIG. 8a;

DETAILED DESCRIPTION

Figure 1:
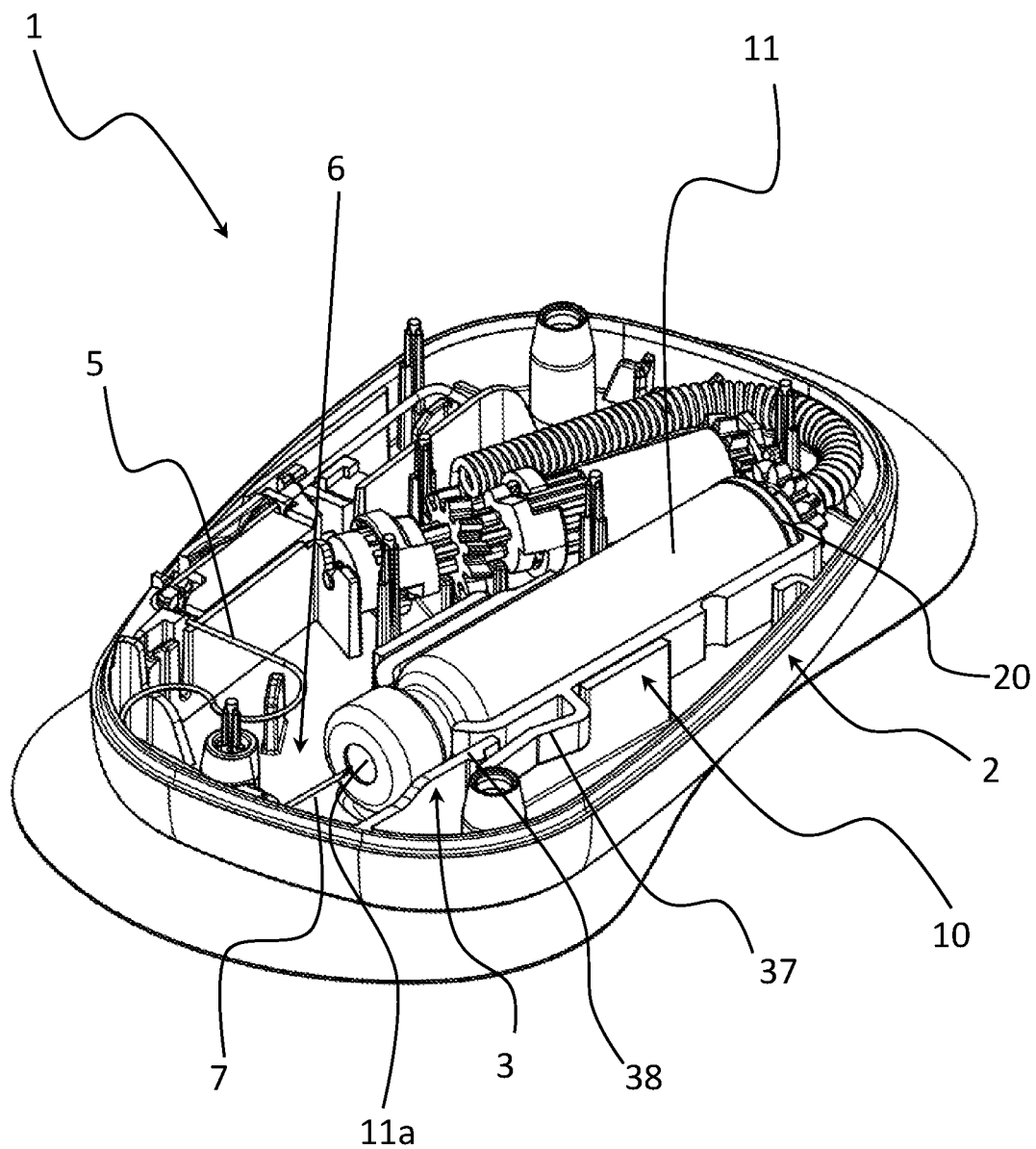
FIG. 1 is a schematic perspective view of a portion of a medicament delivery apparatus comprising a first embodiment of the device of the present invention.

With reference to FIG. 1, a portion of a medicament delivery apparatus is indicated by 1. In particular, it is a pumping apparatus that can be worn by the patient and is configured to be attached to the patient's body, e.g. via a catheter, an adhesive plaster or a belt.

The apparatus 1 comprises an outer casing 2, which in turn comprises a lower shell and an upper shell that can be coupled to each other. In FIG. 1 only the lower shell of the outer casing 2 is shown, i.e. the part which is intended to come into contact with the patient's body in the example described and illustrated herein.

The apparatus 1 further comprises a device 10 which, in accordance with the present invention, is configured to connect a reservoir 11 to a fluid pathway 5. Such a device comprises, in addition to the reservoir 11, the further components described below.

The reservoir 11 extends along a longitudinal axis X (shown, for example, in FIGS. 2a and 2b) and comprises a medicament to be dispensed to the patient via the fluid pathway 5.

In the embodiment illustrated in the accompanying drawings, the fluid pathway 5 is defined by a cannula having, at one end, a needle 7.

The needle 7 is fixed in a service area 6 defined within the outer casing 2 and is configured to pierce a septum 11a (or membrane) specifically arranged on a front surface of the reservoir 11, so as to allow dispensing of the medicament to the patient.

Figure 2A:
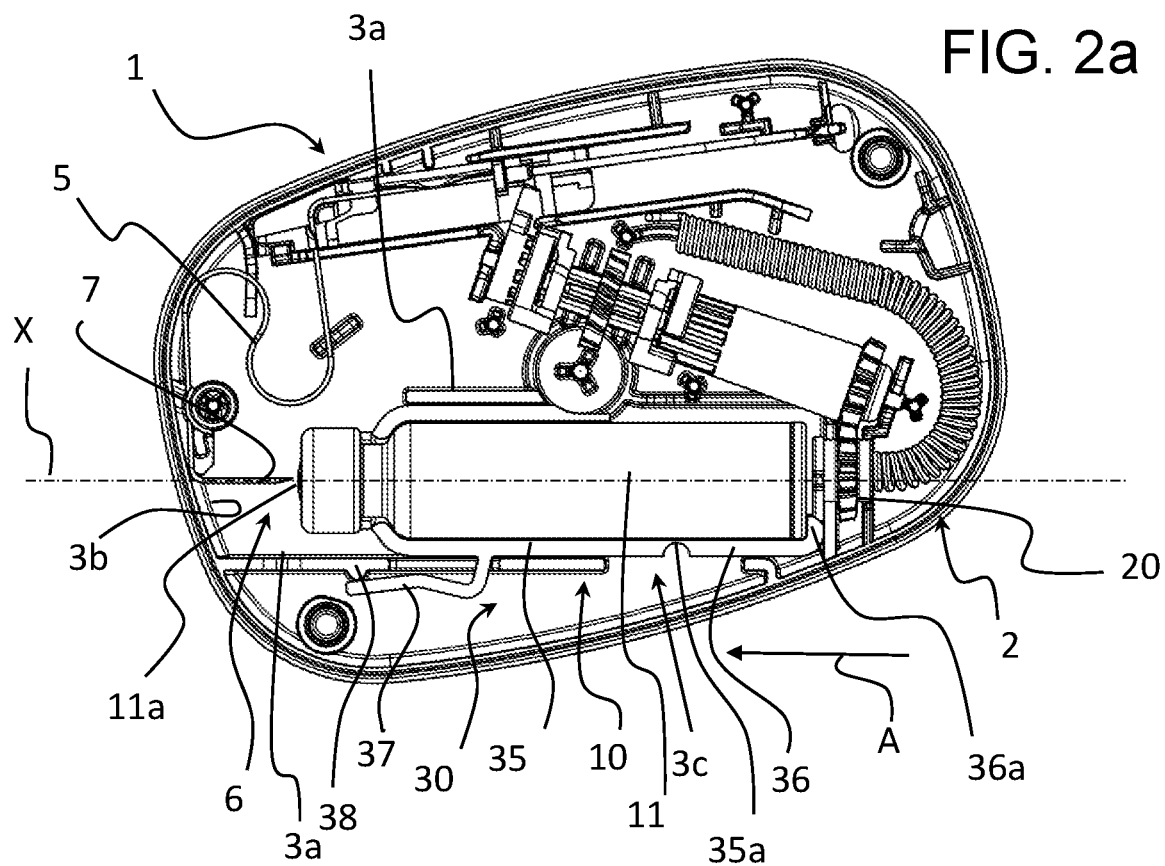
FIGS. 2a and 2b are schematic views from above of the portion of the apparatus of FIG. 1 with the device of the present invention at two different operative configurations thereof.
Figure 2B:
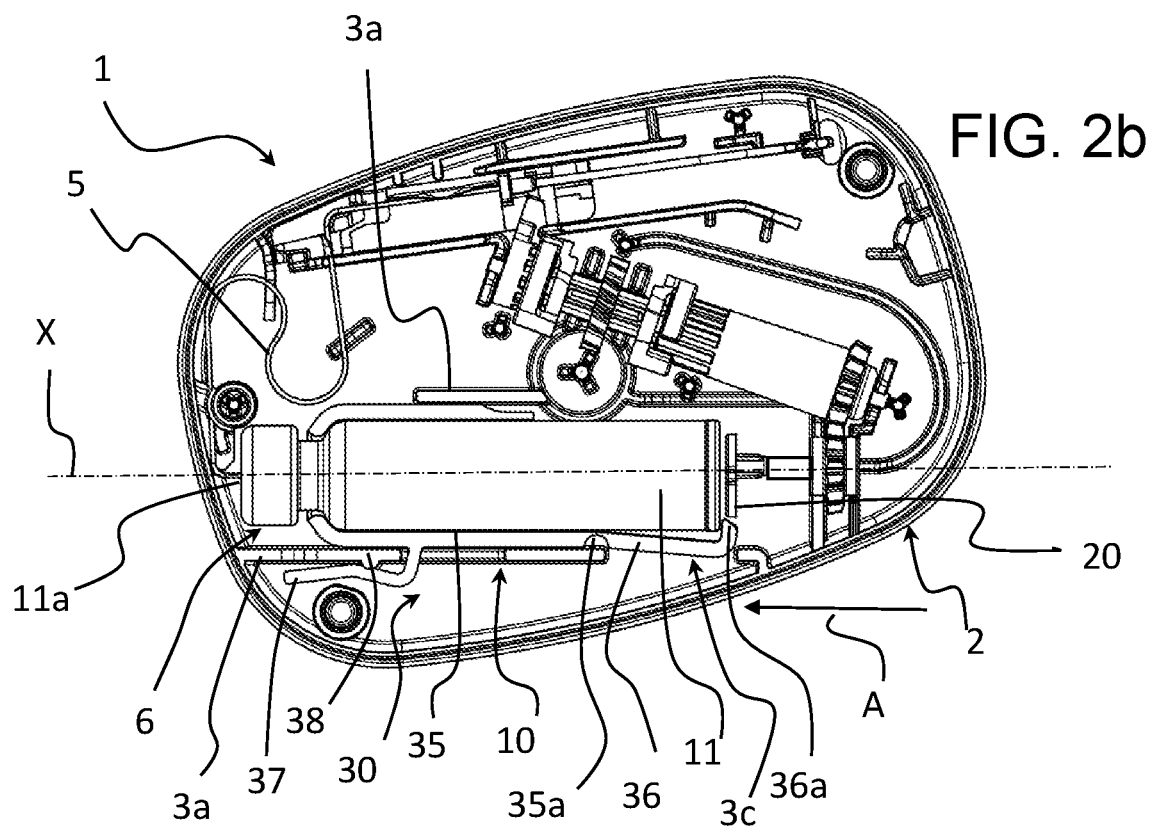

FIGS. 2a and 2b show the apparatus 1 before and after, respectively, the septum 11a has been pierced by the needle 7. It can be seen that the piercing of the septum 11a by the needle 7 is consequent to a movement of the reservoir 11 towards the needle 7 along an axial direction A parallel to the longitudinal axis X.

A plunger 15 (visible in FIGS. 3d, 8b and 9a-9c) is provided inside the reservoir 11. The plunger is configured to be moved along the axial direction A and to push the medicament in order to allow the medicament to be dispensed to the patient.

A piston 20 is configured to be moved along the axial direction A to selectively control the movement along the axial direction A of the reservoir 11 with respect to the outer casing 2 or of the plunger 15 inside the reservoir 11, passing from an initial operative configuration of the device 10 at which by effect of the axial movement of the piston 20 the reservoir 11 is pierced by the needle 7, and the plunger 15 does not move axially with respect to the reservoir 11, to a final operative configuration of the device 10 at which, by effect of the axial movement of the piston 20, the plunger 15 pushes the medicament provided in the reservoir 11 into the fluid pathway 5 and thus towards the patient, and the reservoir 11 does not move axially with respect to the outer casing 2.

Figure 6A:
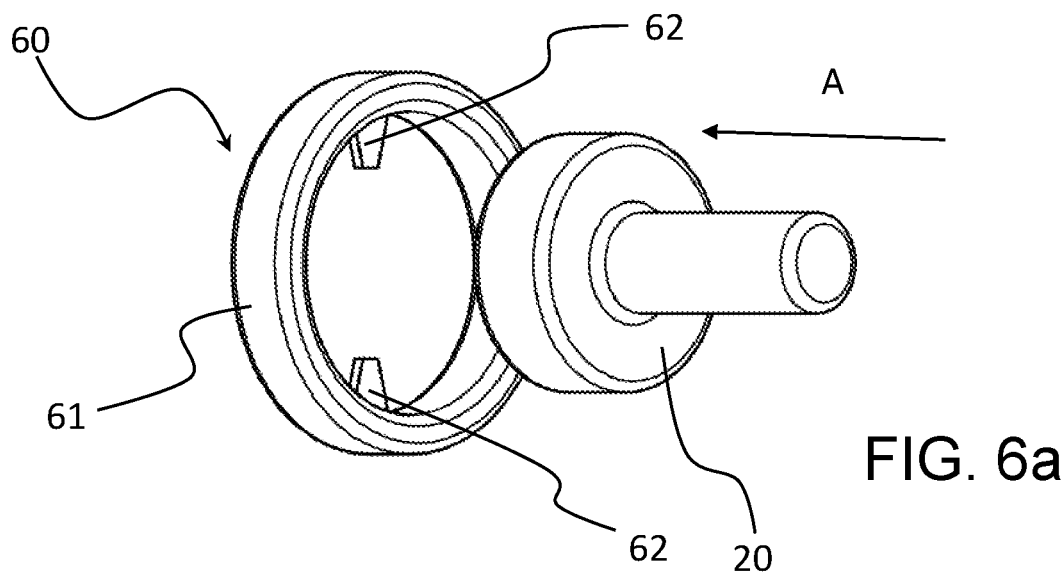
FIGS. 6a, 6b and 6c are schematic views, perspective, lateral and longitudinal section, respectively, of an alternative embodiment of a component of the device of the present invention when such device is at two different operative configurations, the section being taken in the plane whose trace is indicated by A in FIG. 6b.
Figure 6B:
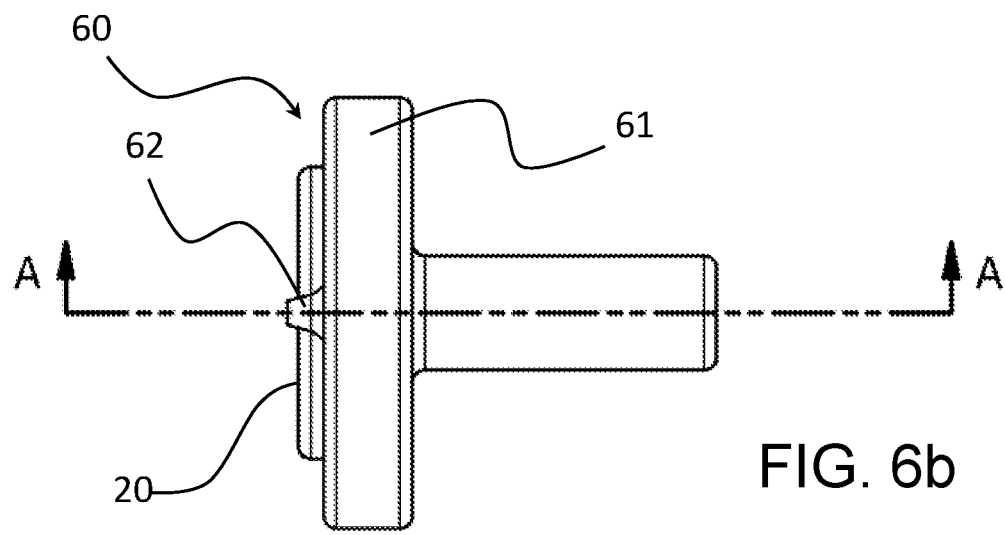
Figure 6C:
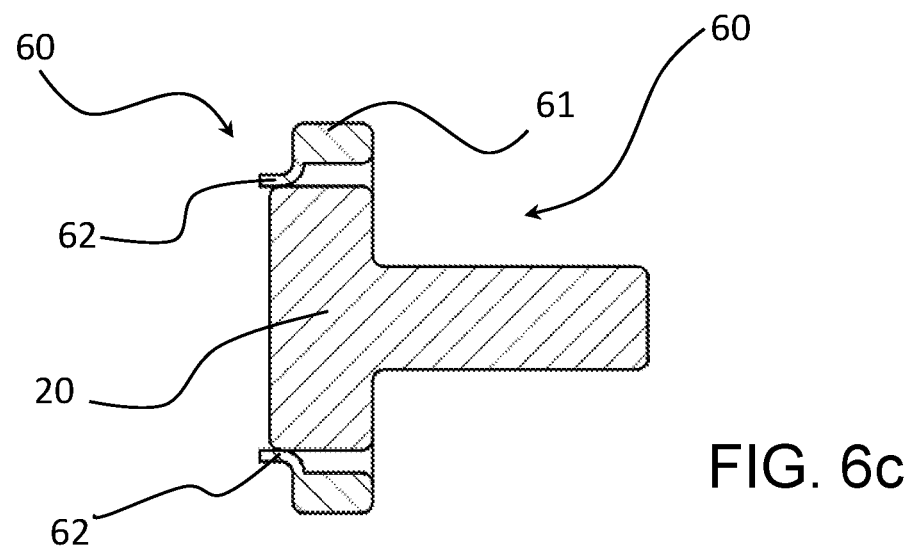
Figure 8A:
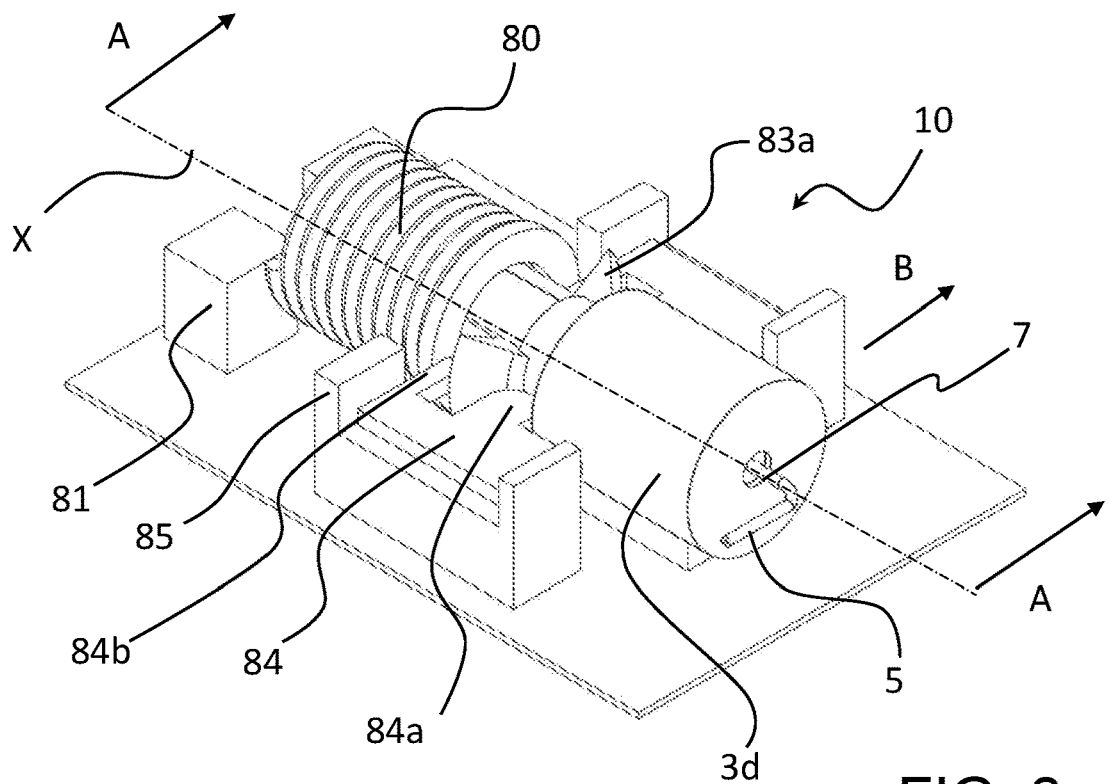
Figure 8B:
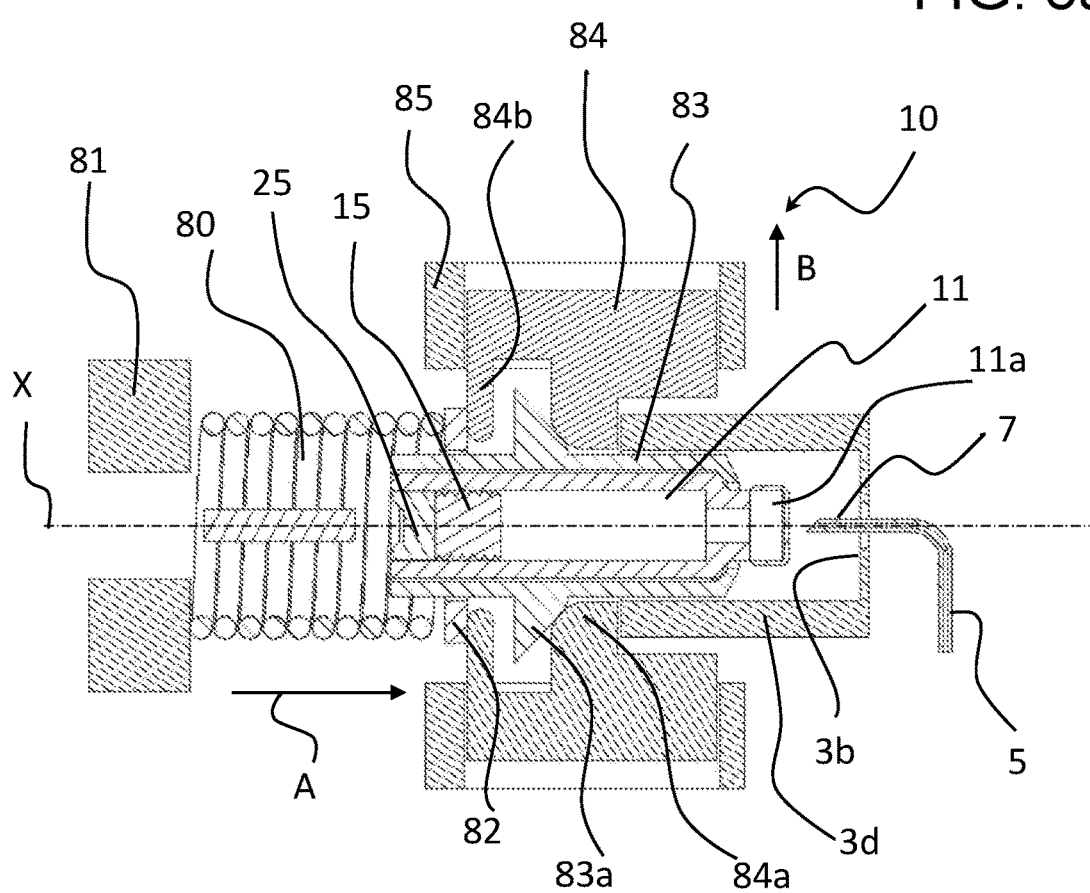

The piston has preferably a frustoconical shape, as illustrated in FIGS. 3a and 3d and 9a-9c, or a cylindrical shape, as for example illustrated in FIGS. 6a, 6c and 8b.

In the present description, structural components of the apparatus 1 other than those described above and other than those of the device 10 will not be described as they are entirely conventional. For example, such components are known from WO 2020/128821A1.

With reference to FIGS. 1, 2a and 2b, in the device 10 of the present invention the reservoir 11 is slidingly housed within a main body 3 which, in the illustrated embodiment, is defined by two opposite walls 3a extending internally from the lower shell of the outer casing 2 starting from the lower wall of the outer casing 2.

The main body 3 comprises an axial abutment surface 3b which, in the embodiment of FIGS. 1, 2a and 2b, is defined by a portion of the inner surface of the lower shell of the outer casing 2.

This axial abutment surface 3b defines an end-stroke position of the reservoir 11 after the needle 7 has pierced the septum 11a as a result of the axial thrust exerted on the reservoir 11 by the piston 20 during a first part of the axial movement of the latter, when the device 10 is at its initial operative configuration. After the reservoir 11 has abutted on the axial abutment surface 3b, and thus when the device 10 has passed into its final operative configuration, the axial movement of the piston 20 causes an axial thrust of the piston 20 on the plunger 15.

The device 10 illustrated in FIGS. 1, 2a and 2b comprises a thrusting member 30 which, when the device 10 is at its initial operative configuration, is at least in part axially arranged between the piston 20 and the reservoir 11 to allow the piston 20 to push the reservoir 11 along the axial direction A, and which, when the device 10 is at its final operative configuration, has moved so as to allow the piston 20 to abut against the plunger 15 and to push the latter along the axial direction A.

In the embodiment of FIGS. 1, 2a and 2b, the thrusting member comprises a sliding element 35 arranged between the reservoir 11 and a wall 3a of the main body 3. The sliding element 35 is integral with the reservoir 11, so that it can be axially moved together with the reservoir 11 during the movement of the latter along the axial direction A.

The sliding element 35 comprises an elastic portion 36 connected to the remaining portion of the sliding element 35 at a hinge 35a.

In the illustrated example, a pushing element 36a is defined at the free end of the elastic portion 36 which, when the device 10 is at its initial operative configuration, is arranged between the piston 20 and the reservoir 11 (FIG. 2a) and which, when the device 10 is at its final operative configuration, is housed in a seat 3c formed on the wall 3a of the main body 3 (FIG. 2b), allowing the piston 20 to be able to abut against the plunger 15.

In particular, the pushing element 36a consists of a curved free end of the elastic portion 36.

The elastic portion 36 is such that, at rest, it is substantially parallel to the longitudinal axis X of the main body 3. The housing of the pushing element 36a in the seat 3c occurs in this case due to the thrust exerted by the piston 20 on the pushing element 36a and the consequent rotation of the elastic portion 36 about the hinge 35a when the elastic portion 36 and the pushing element 36a are at the seat 3c.

The seat 3c is preferably formed at a distance from the axial abutment surface 3b such that when the reservoir 11 abuts against the axial abutment surface 3b the elastic portion 36 and the pushing element 36a are at the seat 3c and, being able to rotate about the hinge 35a, enter the seat 3c.

Thus, when the pushing element 36a is axially arranged between the piston 20 and the reservoir 11, the device 10 is at its initial operative configuration and the piston 20 can axially push the sliding element 35 which in turn can axially push the reservoir 11 along the axial direction A, whereas when the pushing element 36a is housed in the seat 3c the device 10 is at its final operative configuration, with the reservoir 11 abutting against the axial abutment surface 3b, and the piston 20 can axially push the plunger 15 and thus allow the dispensing to the patient, through the needle 7 and the fluid path 5, of the medicament provided inside the reservoir 11.

In the apparatus of FIGS. 1, 2a and 2b, instead of the device 10 described above with reference to FIGS. 1, 2a and 2b, an alternative device may be used, such as, for example, the one illustrated in FIGS. 3a-3d.

In the embodiment of FIGS. 3a-3d, the main body 3 comprises two opposite walls 3a extending from an axial abutment surface 3b and having substantially equal lengths. Such a main body 3 may be made in a single piece with the outer casing 2 or be fixedly attached to the latter.

Each of the two walls 3a comprises, close to its free end opposite to the axial abutment surface 3b, a respective seat 45a, 45b radially projecting outwardly from the wall 3a. The seats 45a, 45b therefore define an enlargement of the cross-section of the main body 3.

An axial slot 46a, 46b is provided between each seat 45a, 45b and the free end of the respective wall 3a.

The thrusting member, indicated by 40, has an annular shape and comprises two pushing elements 41a, 41b arranged on opposite sides with respect to the longitudinal axis X.

Each pushing element 41a, 41b comprises a respective hook portion 47a, 47b slidingly housed in a respective axial slot 46a, 46b.

Figure 3A:
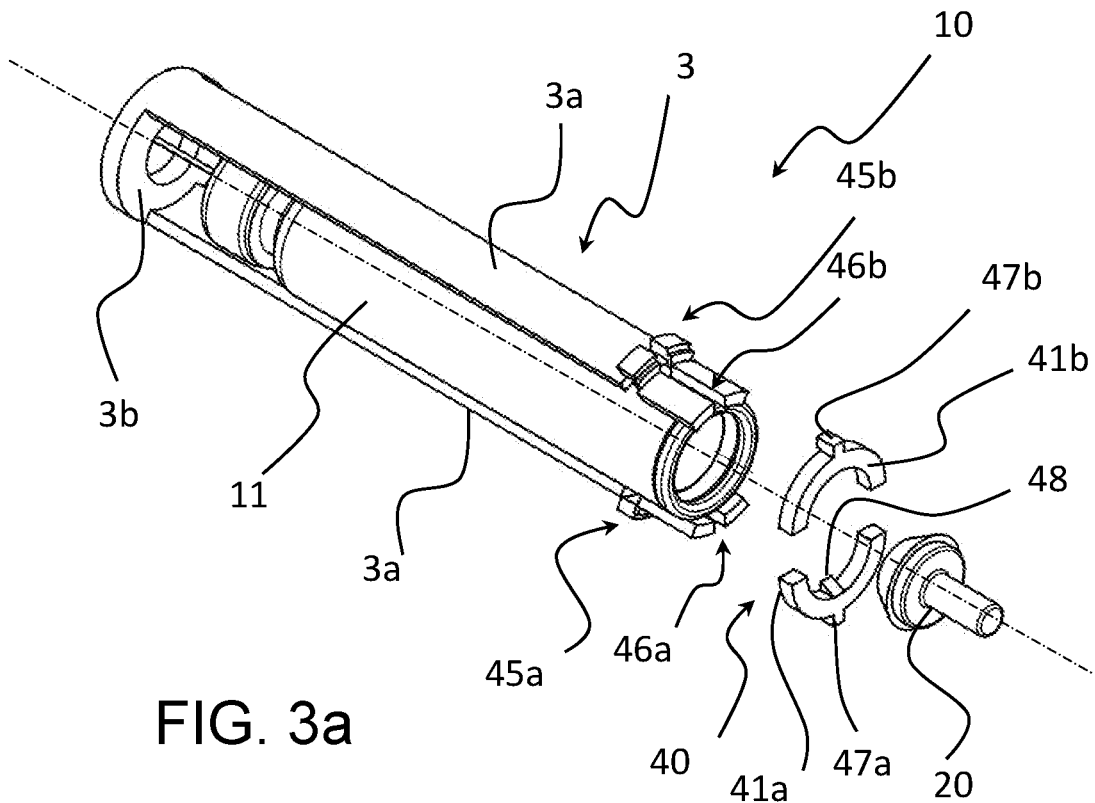
FIG. 3a is an exploded perspective schematic view of an alternative embodiment of the device of the present invention.

At least one of the two pushing elements 41a, 41b further comprises a ramp 48 (FIG. 3a).

Figure 3B:
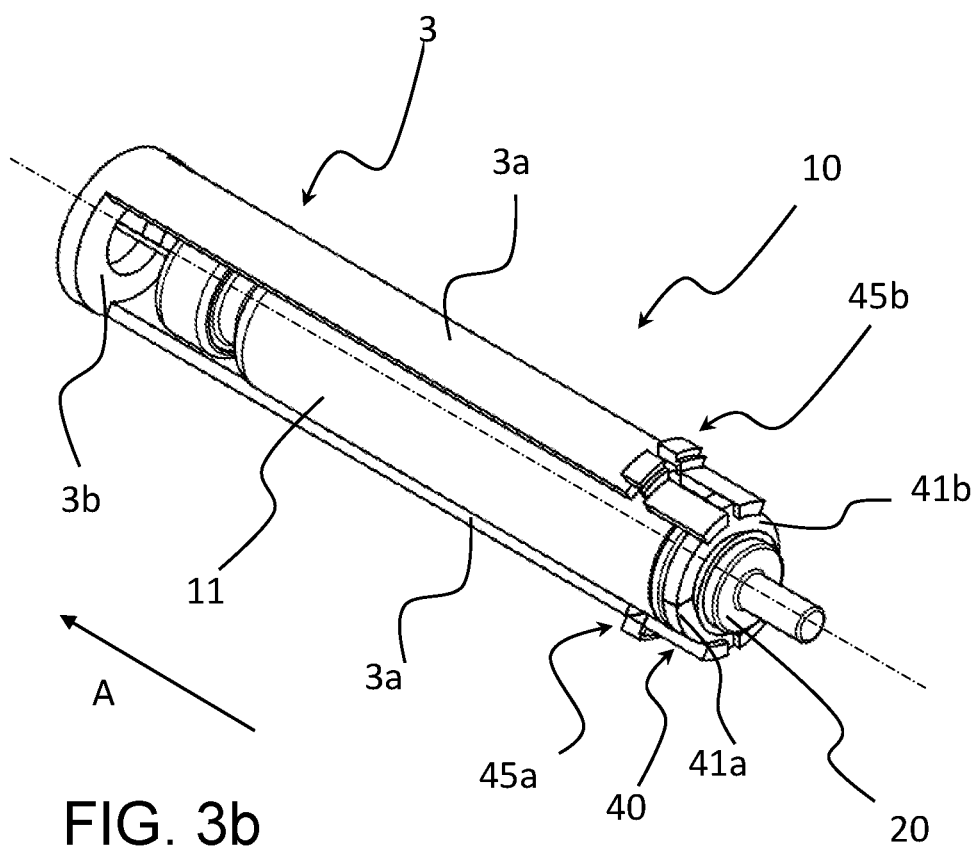
FIGS. 3b and 3c are perspective schematic views of the device of FIG. 3a at two different operative configurations thereof.

When the device 10 is at its initial operative configuration, the two pushing elements 41a, 41b are axially arranged between the piston 20 and the reservoir 11 and close to each other in a radially inner position with respect to the two walls 3a of the main body 3, and in particular in the portions of such walls 3a defined between the free ends of such walls 3a and the seats 45a, 45b, as illustrated in FIG. 3b. The axial movement of the piston 20 along the axial direction A causes in such a case an axial movement of the pushing elements 41a, 41b and, therefore, of the reservoir 11, until the reservoir 11 abuts against the axial abutment surface 3b. The axial movement of the pushing members 41a, 41b is guided by the sliding of the hook portions 47a, 47b in the axial slots 46a, 46b.

Figure 3C:
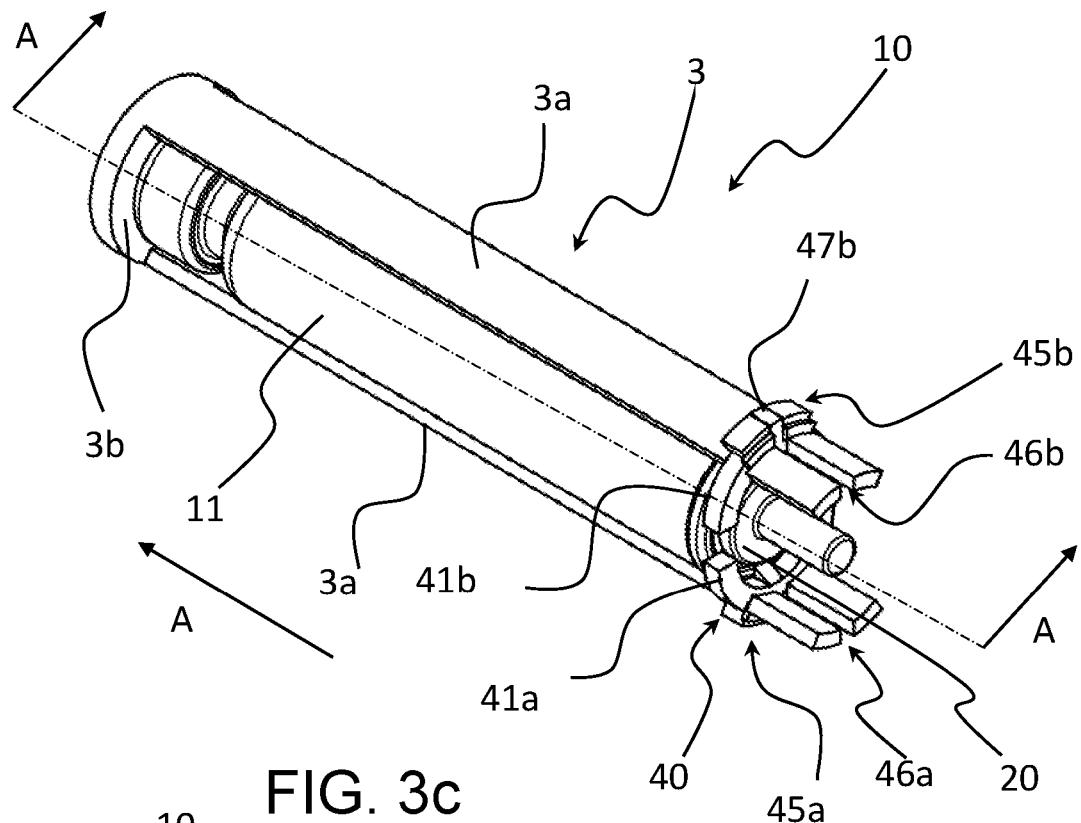
Figure 3D:
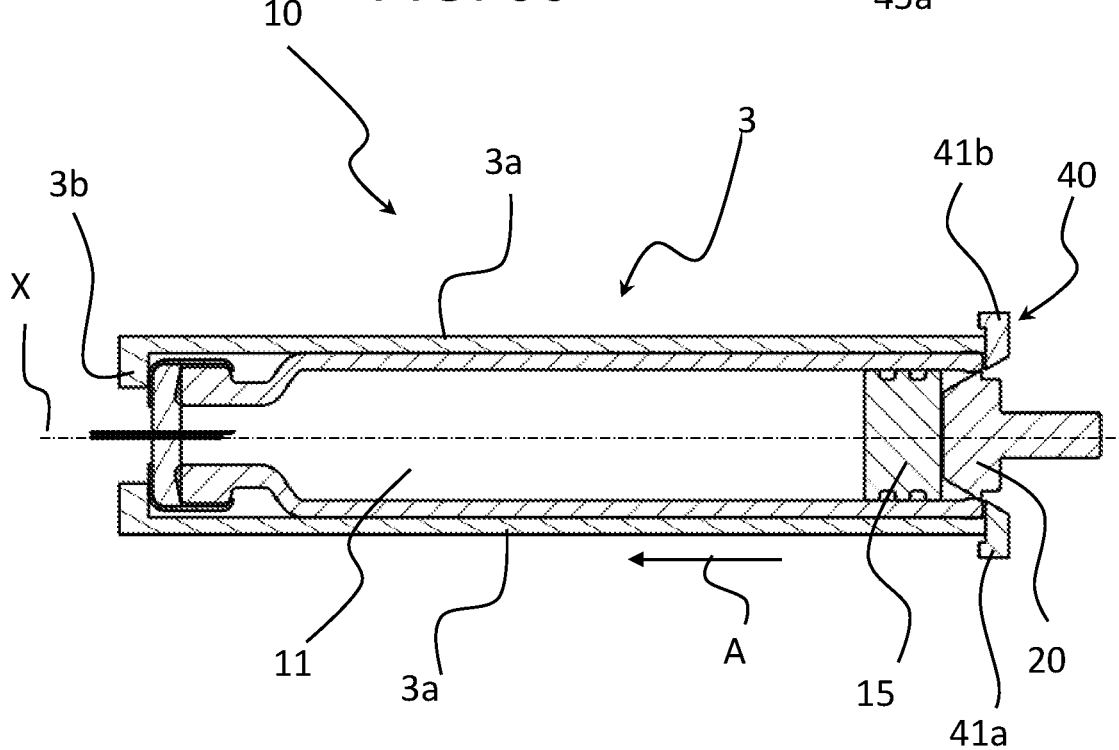
FIG. 3d is a schematic longitudinal sectional view of the device of FIG. 3a at the operative configuration of FIG. 3c, the section being taken in the plane whose trace is indicated by A in FIG. 3c.

When, as a result of the thrust exerted by the piston 20 on the ramp 48, the pushing elements 41a, 41b enter the seats 45a, 45b, moving away from each other, each hook portion 47a, 47b locks the respective pushing element 41a, 41b in position inside the respective seat 45a, 45b, as illustrated in FIG. 3c. The device 10 thus passes into its final operative configuration, at which, continuing to move the piston 20 along the axial direction A the latter slides in a radially inner position with respect to the pushing elements 41a, 41b, enters the reservoir 11 and acts in thrust on the plunger 15, as illustrated in FIG. 3d, actuating the dispensing of the medicament to the patient.

Figure 4A:
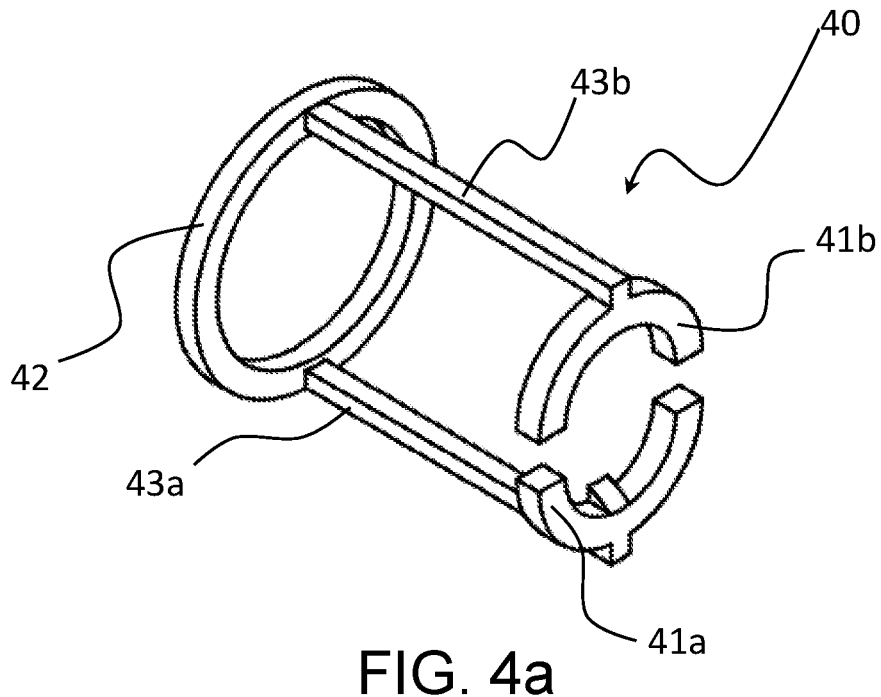
FIG. 4a is a perspective schematic view of a component of a further alternative embodiment of the device of the present invention.
Figure 4B:
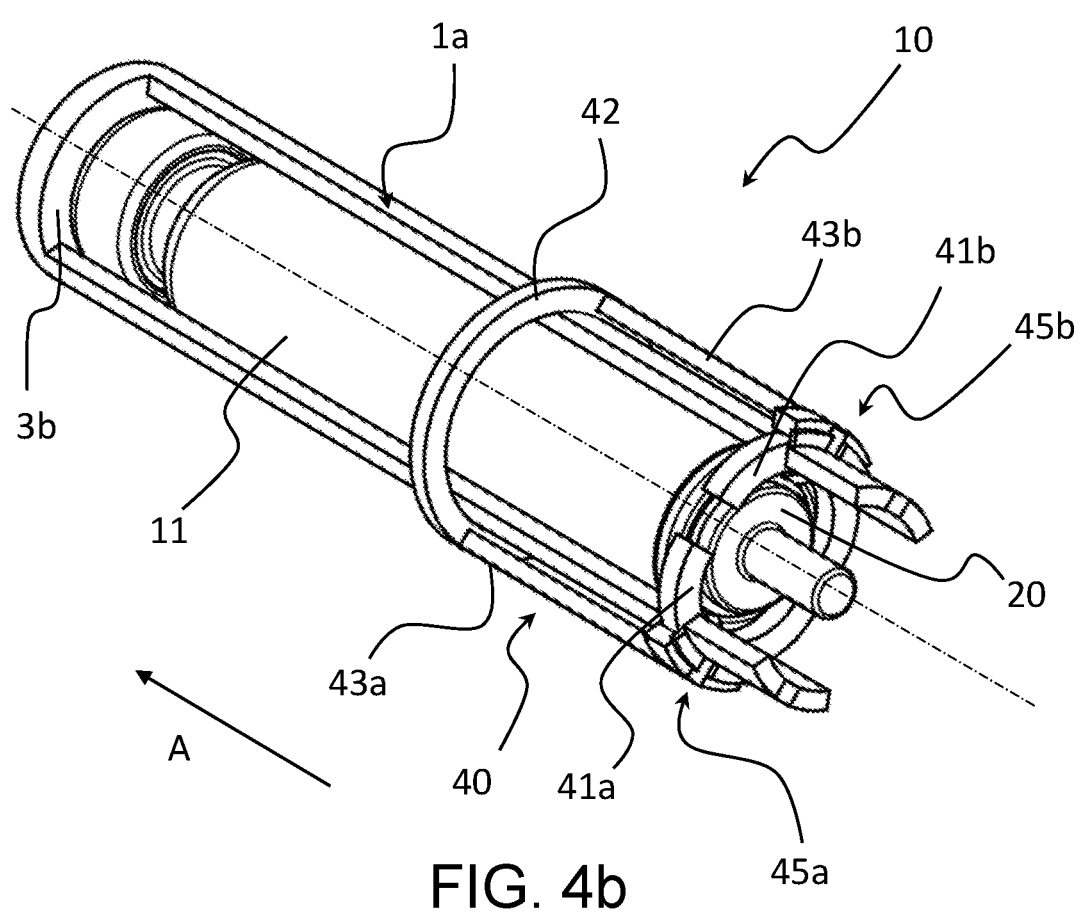
FIG. 4b is a perspective schematic view of an embodiment of the device of the present invention in which the component of FIG. 4a is used, at an operative configuration thereof.

As an alternative to the thrusting member 40 described above and illustrated in FIGS. 3a-3d, a thrusting member 40 of the type illustrated in FIG. 4a may be provided. Such a thrusting member 40 differs from the one illustrated in FIGS. 3a-3d only in that it comprises a ring 42 configured to be slidingly fitted onto the main body 2 (as illustrated in FIG. 4b) and a pair of elastically bendable arms 43a, 43b arranged on opposite sides with respect to the longitudinal axis X. Each arm 43a, 43b connects the ring 42 to a respective thrusting element 41a, 41b.

The two arms 43a, 43b are such that, at rest, their free ends tend to assume a mutual spaced apart position, thus causing the pushing elements 41a, 41b to assume a corresponding mutual spaced apart configuration, whereas when the pushing elements 41a, 41b are housed in a radially inner position with respect to the two walls 3a of the main body 3 and out of the seats 45a, 45b the free ends of the arms 43a, 43b are forced to assume a mutual approaching condition, thus making the pushing elements 41a, 41b assume a corresponding mutual approaching configuration. In the latter configuration the arms 43a, 43b pass through the axial slots 46a, 46b described above with reference to FIGS. 3a-3d.

FIG. 4b shows an operative configuration equivalent to that of FIG. 3c, i.e. when the device 10 is at its final operative configuration. In this configuration, the two pushing elements 41a, 41b are housed in their respective seats 45a, 45b and are in a mutually spaced apart condition. This configuration is achieved due to the elastic return action exerted by the arms 43a, 43b when the pushing elements 41a, 41b reach the seats 45a, 45b.

Figure 5A:
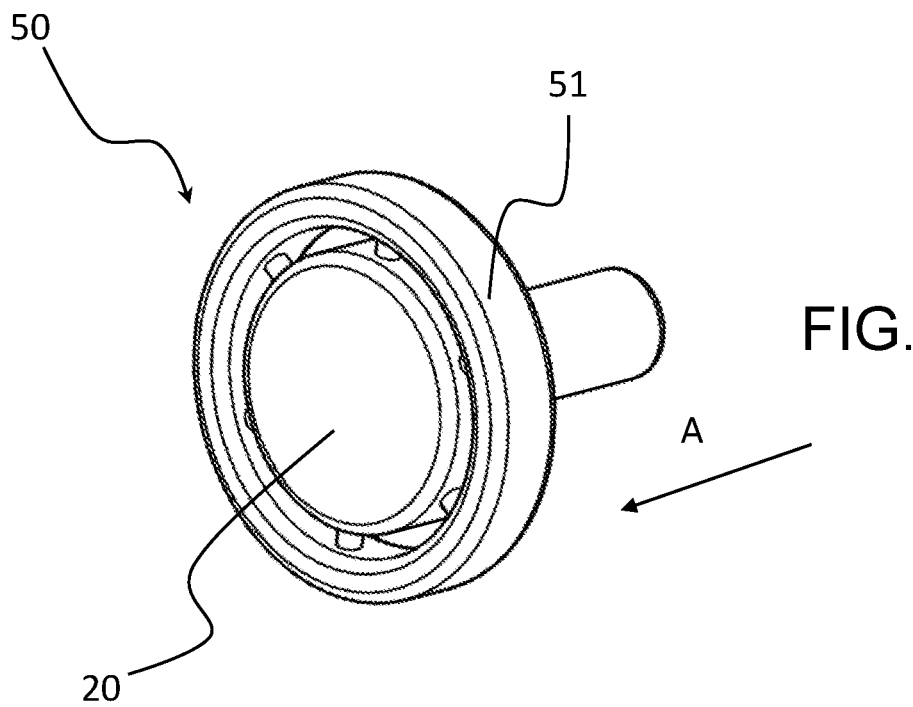
FIGS. 5a and 5b are schematic views, perspective and front, respectively, of a component of a further alternative embodiment of the device of the present invention at an operative configuration thereof.
Figure 5B:
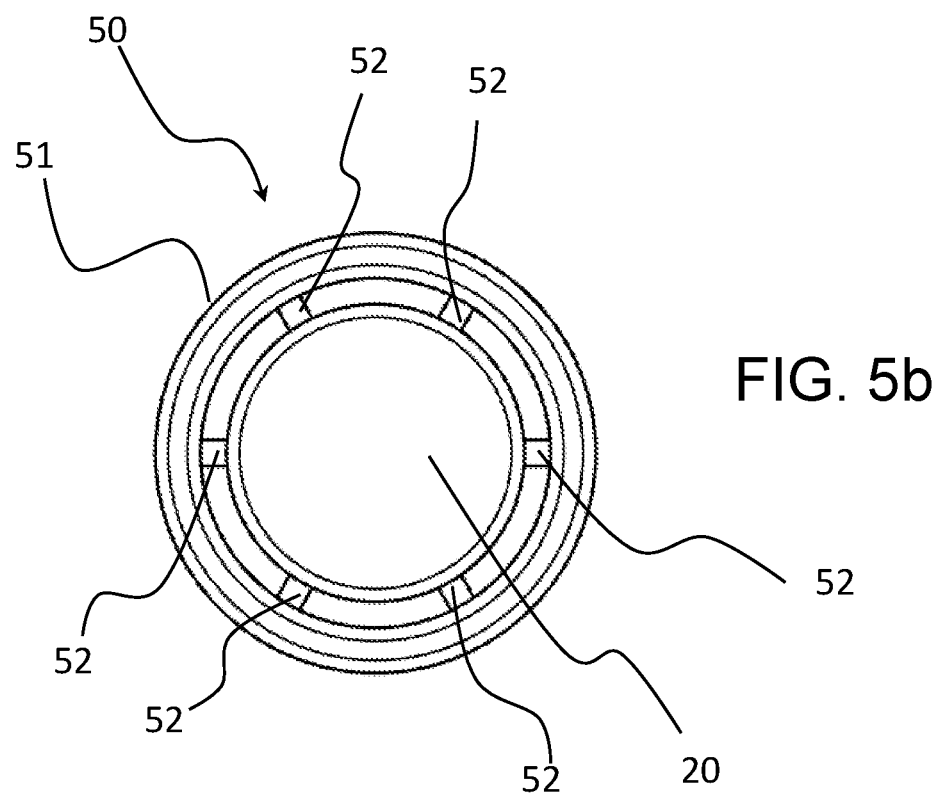

As an alternative to the thrusting members 40 described above and illustrated in FIGS. 3a-3d, 4a and 4b, a thrusting member 50 of the type illustrated in FIGS. 5a, 5b may be provided.

The thrusting member 50 comprises a ring 51 configured to operate in axial abutment against the reservoir 11 and connected to the piston 20 by a plurality of connecting elements 52.

In the embodiment illustrated herein, for example, there are six connecting elements 52, circumferentially equidistant from each other.

The connecting elements 52 are configured to break when the reservoir 11 abuts against the axial abutment surface 3b and the piston 20 continues to move in the axial direction A.

As a result of the breakage of the connecting elements 52, the device 10 passes from its initial operative configuration, at which the piston 20, when moved along the axial direction A, axially pushes the ring 51 and therefore the reservoir 11, to its final operative configuration, at which the piston 20, when moved along the axial direction A, slides in an axially inner position with respect to the ring 51 (which remains in abutment against the reservoir 11) and axially pushes the plunger 15.

As an alternative to the thrusting members described above and illustrated in FIGS. 3a-3d, 4a, 4b, 5a and 5b, a thrusting member 60 of the type illustrated in FIGS. 6a-6c may be provided.

The thrusting member 60 comprises a ring 61 having at least one bendable fin 62 radially projecting inwardly from the ring 61 and intended to bend when the reservoir 11 abuts against the axial abutment surface 3b and the piston 20 continues to be moved along the axial direction A.

In the illustrated embodiment, there are, for example, two bendable fins 62 arranged on diametrically opposite sides.

As a result of the deformation of the bendable fins 62, the device 10 passes from its initial operative configuration, in which the piston 20, when moved along the axial direction A, axially pushes the ring 61 and therefore the reservoir 11, to its final operative configuration, in which the piston 20, when moved along the axial direction A, slides in an axially inner position with respect to the ring 61 (which remains against the reservoir 11) and axially pushes the plunger 15.

Figure 7A:
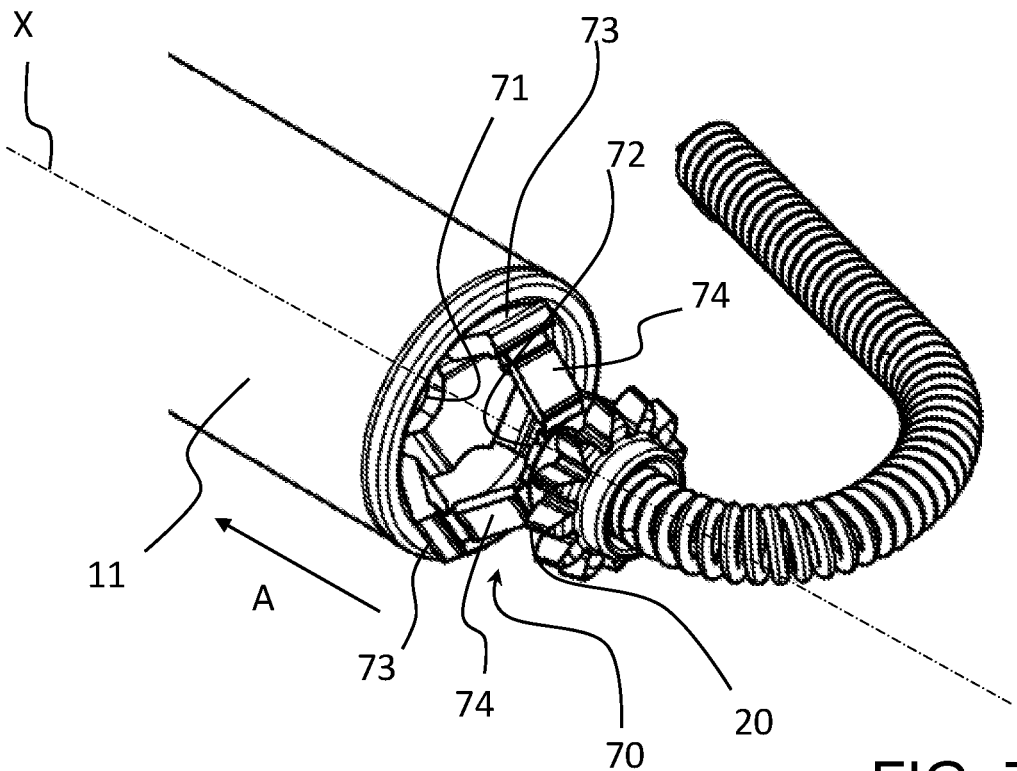
FIGS. 7a and 7b are perspective schematic views of a portion of a further alternative embodiment of the device of the present invention at two different operative configurations thereof.
Figure 7B:
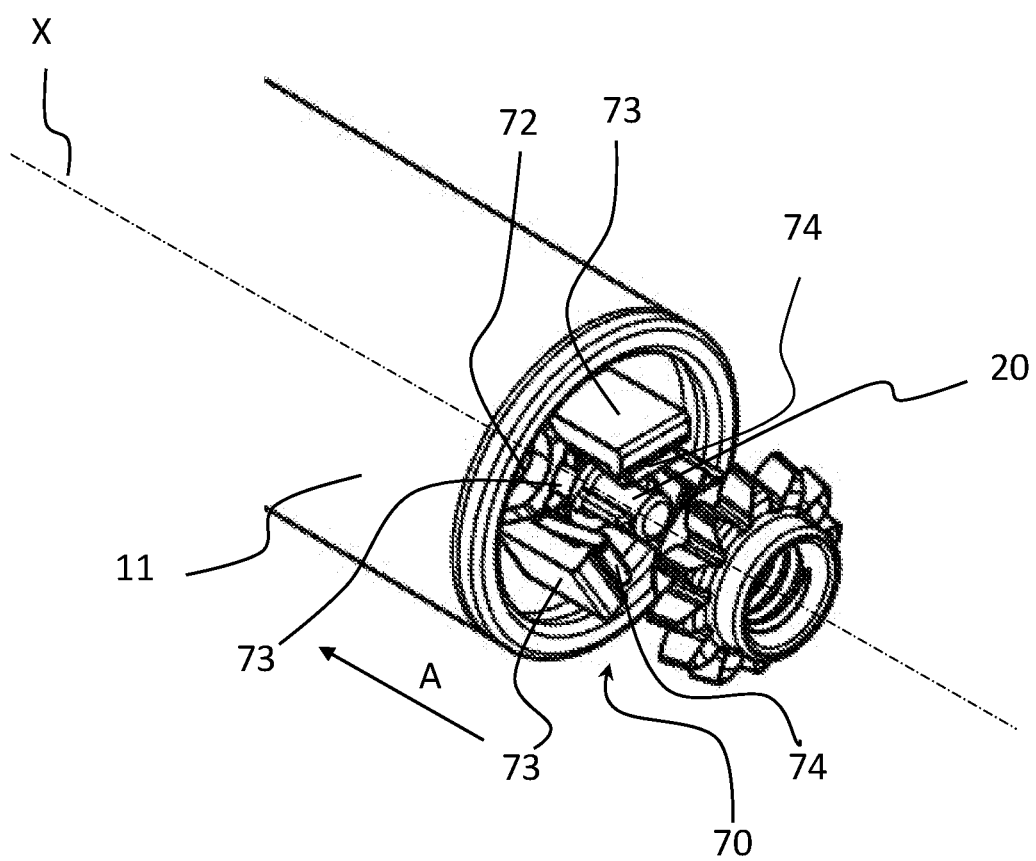

As an alternative to the thrusting members described above and illustrated in FIGS. 3a-3d, 4a, 4b, 5a, 5b, and 6a-6c, a thrusting member 70 of the type illustrated in FIGS. 7a and 7b may be provided.

Unlike the thrusting members 30, 40, 50 and 60 described above, the thrusting member 70 enters into the reservoir 11 when the device 10 is at its final operative configuration.

The thrusting member 70 comprises a bi-stable pushing element having, at a first shape configuration thereof, an outer diameter greater than the inner diameter of the reservoir 11 and, at the second shape configuration thereof, an outer diameter smaller than the inner diameter of the reservoir 11.

Said bi-stable pushing element comprises a central portion 71 substantially orthogonal to the longitudinal axis X, a thrusting portion 72 parallel to the central portion 71 and configured to be pushed by the piston 20 along the axial direction A, and a radially outer portion connecting the central portion 71 to the thrusting portion 72.

The radially outer portion is movable between an expanded position (FIG. 7a) at which the bi-stable pushing element is at its first shape configuration and a retracted position (FIG. 7b) at which the bi-stable pushing element is at its second shape configuration.

In the specific example illustrated herein, the radially outer portion comprises a plurality of articulated arms each comprising two articulated appendices 73 and 74 which, when the radially outer portion is in the expanded position, extend from opposite sides with respect to a mutual joining line of the articulated appendices 73 and 74 (FIG. 7a) and which, when the radially outer portion is in the retracted position, extend from the same side with respect to said mutual joining line and are in a mutually overlapping condition (FIG. 7b).

In the specific example shown here, there are three circumferentially equidistant articulated arms.

When the radially outer portion is at the expanded position, it abuts against the reservoir 11 and the thrusting portion 72 is spaced apart from the central portion 71 (FIG. 7a). The movement of the piston 20 along the axial direction A causes in this case the displacement of the thrusting member 70, and therefore of the reservoir 11, along the axial direction A. The device 10 is at its initial operative configuration and this operative configuration is maintained until the reservoir 11 abuts against the axial abutment surface 3b.

At this point, the device 10 passes into its final operative configuration, in which, due to the axial movement of the piston 20, the radially outer portion passes from its expanded position to its retracted position. In particular, the thrusting portion 72 approaches the central portion 71 (FIG. 7b), for example until it abuts against the central portion 71, the articulated arms 73 and 74 are arranged in the aforementioned mutual overlapping condition and enter the reservoir 11 together with the central portion 71 and the thrusting portion 72, allowing the central portion 71 to axially push the plunger 15.

In the apparatus of FIGS. 1, 2a and 2b, a device 10 of the type illustrated in FIGS. 8a and 8b may be used instead of the device 10 illustrated in these figures.

Such a device 10 comprises a spring 80 arranged preloaded in a radially outer position with respect to the piston 20 (not illustrated in FIGS. 8a and 8b) between a fixed element 81 and a movable element 82.

A flange 83 having a ramp portion 83a is provided at a radially outer position with respect to the reservoir 11.

A trigger element 84 is arranged in a radially outer position with respect to the flange 83. Said trigger element 84 is slidable along a direction B orthogonal to the longitudinal axis X within a guide element 85 and comprises a shaped portion 84a interposed between the ramp portion 83a and a cylindrical body 3d fixedly associated with the main body 3. The trigger element 84 further comprises a first portion 84b in axially abutment against the movable body 82.

When the piston 20 moves along the axial direction A, it pushes the plunger 15, which in turn pushes the medicament provided into the reservoir. Since the reservoir 11 is sealed, this thrust causes an axial movement of the reservoir 11 along the axial direction A until the needle 7 pierces the septum 11a of the reservoir 11.

At the same time, the shaped portion 84a comes into contact with the ramp portion 83a and slides on the latter, moving the trigger element 84 away from the flange 83 along the direction B. The movable element 82 is at this point free to move along the axial direction A due to the thrust exerted by the spring 80 and abuts against the ramp portion 83a, bringing the reservoir 11 in abutment against the axial abutment surface 3b and allowing the needle 7 to completely enter the reservoir 11. Subsequent movement of the piston 20 in the axial direction A acts directly and only on the plunger 15 and allows the medicament to be dispensed to the patient.

In all the above-described embodiments of the invention, a spacer element 25 may be provided between the plunger 15 and the piston 20, such as, for example, the one illustrated in FIG. 8b (in said figure, the piston 20 is not illustrated). This spacer element 25 is housed inside the reservoir 11 in contact with the plunger 15 and is configured to be pushed by the piston 20 along the axial direction A to axially push the plunger 15.

The spacer element 25 prevents the plunger 15 from moving towards the piston 20, i.e. in the direction opposite the aforementioned axial direction A, during sterilisation cycles in which a depression is created inside the reservoir 11.

The spacer element 25 may be made of a material having a coefficient of friction with the reservoir 11 greater than that of the plunger 15.

If, for example, used in the embodiment of FIGS. 1, 2a and 2b, the spacer element 25 is preferably arranged between the piston 20 and the pushing element 36a so that the movement of the plunger 15 towards the piston 20 is stopped by the pushing element 36a and thus it does not cause a movement of the plunger 15 towards the piston 20.

In all the above-described embodiments of the invention, suitable connecting members may be provided to facilitate the achievement of the axial abutment condition between the reservoir 11 and the axial abutment surface 3b and the maintenance of this axial abutment condition during the delivery of the medicament.

Figure 9A:
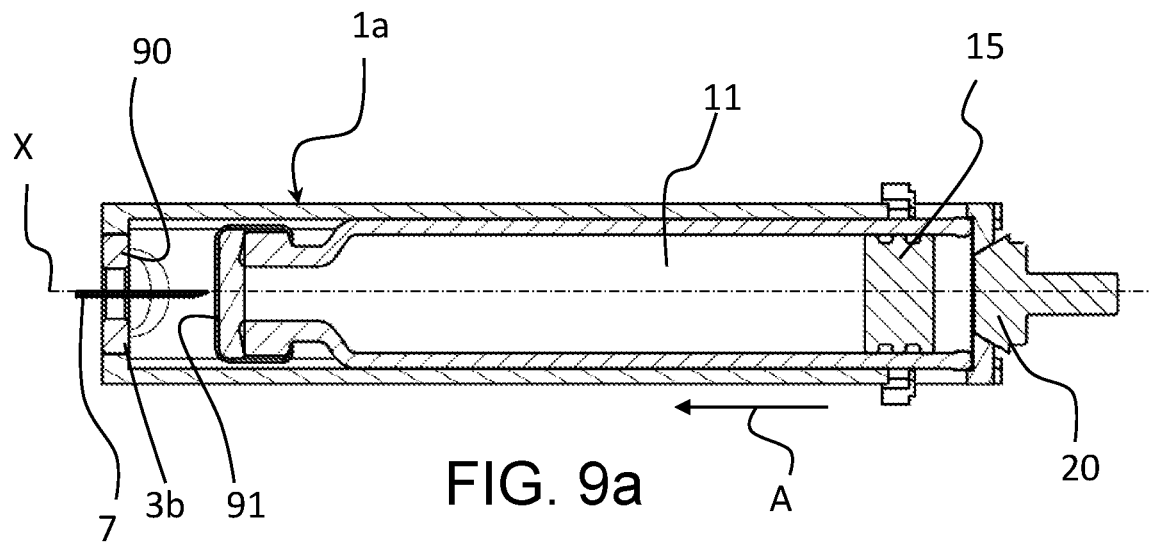
FIGS. 9a, 9b and 9c are schematic longitudinal section views of a further alternative embodiment of the device of the present invention at three different operative configurations thereof.
Figure 9B:
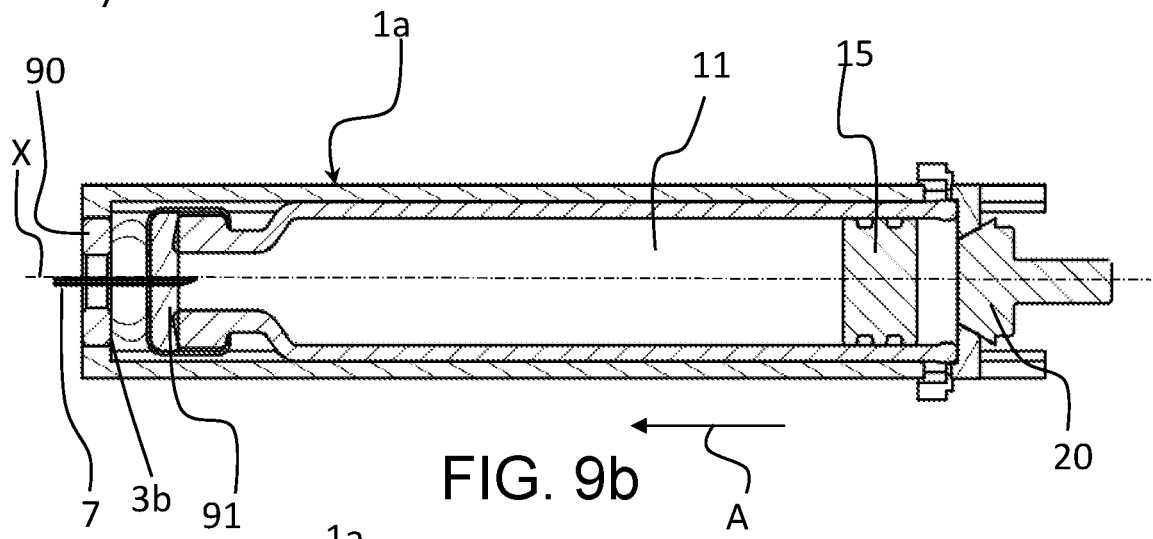
Figure 9C:
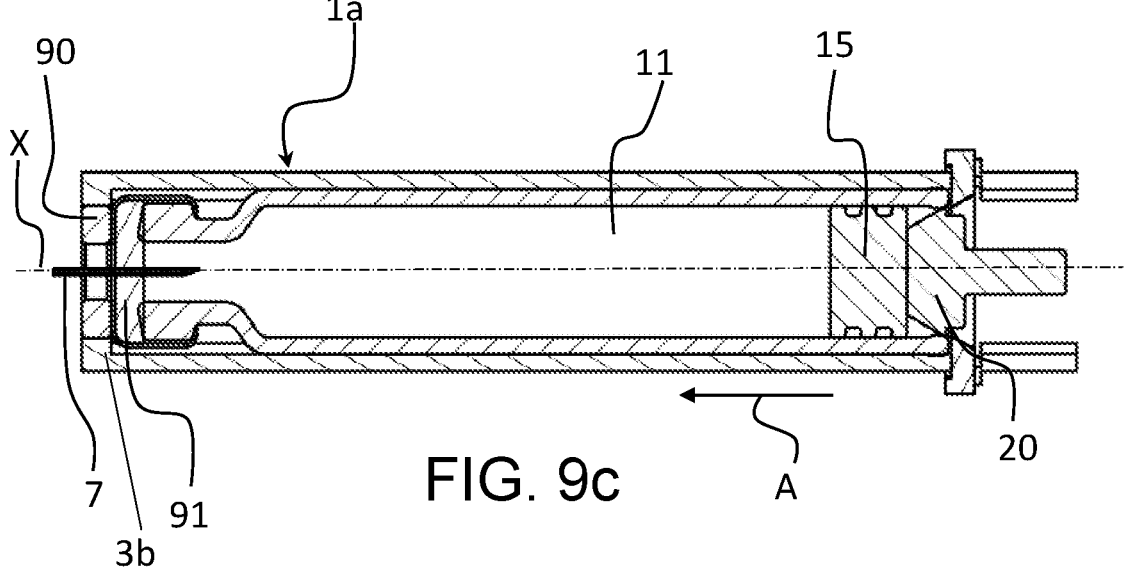

As illustrated, for example, in FIGS. 9a-9c, such connecting members comprise a first magnetic element 90 associated with the main body 3 at the axial abutment surface 3b and a second magnetic element 91 associated with the free end of the reservoir 11 facing the axial abutment surface 3b. When, due to the thrust exerted by the piston 20 in the axial direction A, the reservoir 11 is close to the axial abutment surface 3b, the mutual magnetic attraction of the two magnetic elements 90 and 91 brings the reservoir 11 into contact with the axial abutment surface 3b, preventing a subsequent mutual distancing.

A Hall effect sensor (not shown) magnetically connected to the two magnetic elements 90 and 91 can also be provided to track the movement of the reservoir 11 along the axial direction A.

Alternatively, as for example illustrated in FIGS. 1, 2a and 2b, such connecting members comprise an elastically bendable hook portion 37 associated with the sliding element 35 and a hook element 38 formed on the wall 3a of the main body 3. The hook portion 37 has a curved part and is intended to be deformed by the hook element 38 during the movement of the sliding element 35 (and therefore of the reservoir 11) along the axial direction A.

As illustrated in FIG. 2b, as soon as the hook element 38 is overcome by the curved part of the hook portion 37, due to the elastic return force exerted by the hook portion 37, the hook element 38 generates a thrust along the axial direction A on the hook portion 37. This thrust brings the reservoir 11 into abutment against the axial abutment surface 3b and maintains this abutment during the subsequent delivery of the medicament provided inside the reservoir 11.

Figure 10A:
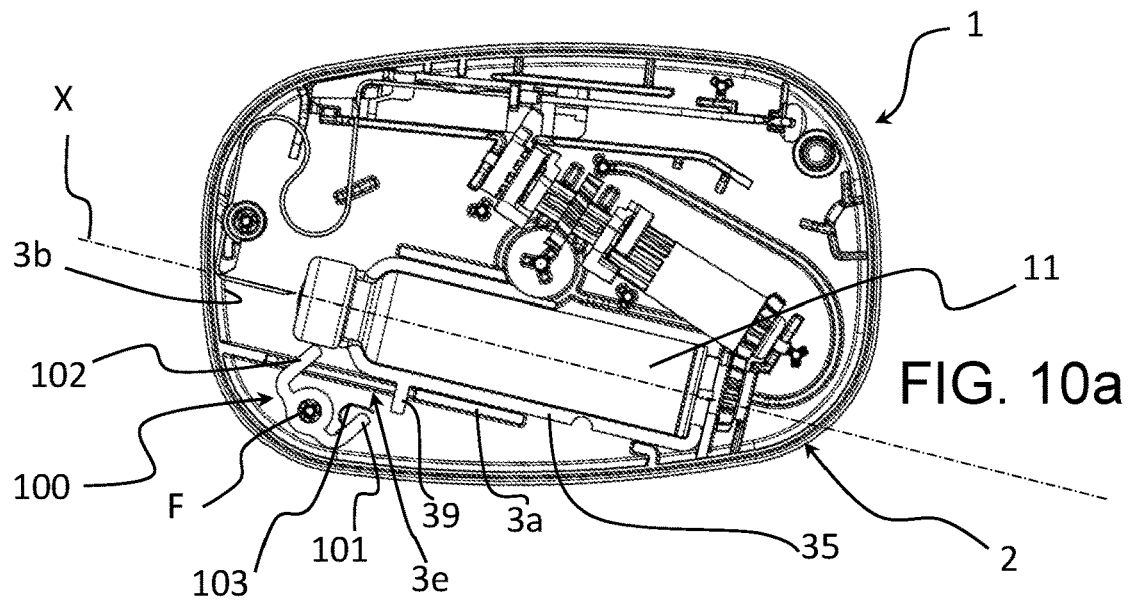
FIGS. 10a, 10b and 10c are top views of the portion of the apparatus of FIG. 1 in which an alternative embodiment of the device of the present invention is provided at three different operative configurations thereof.
Figure 10B:
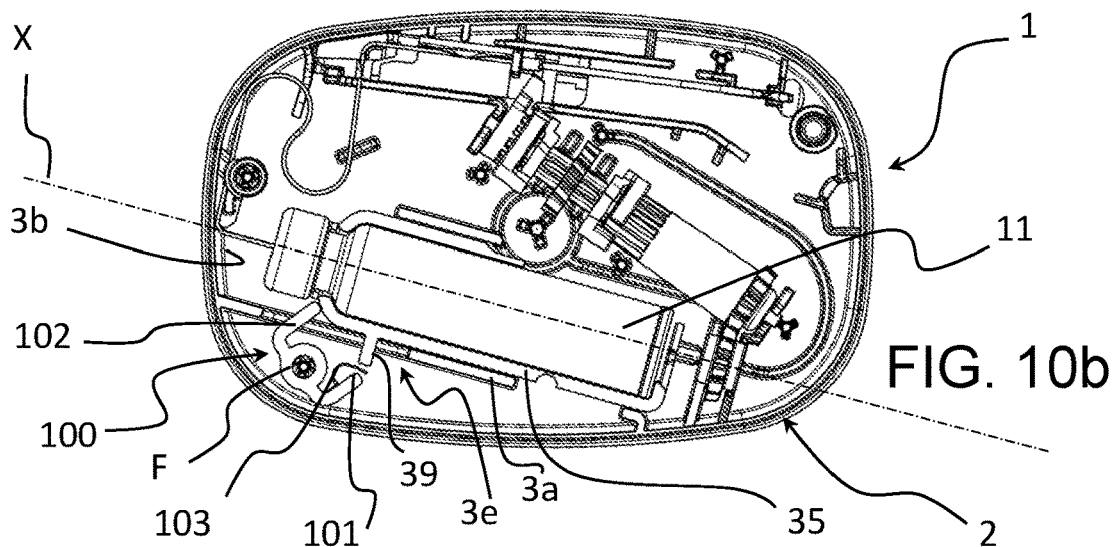
Figure 10C:
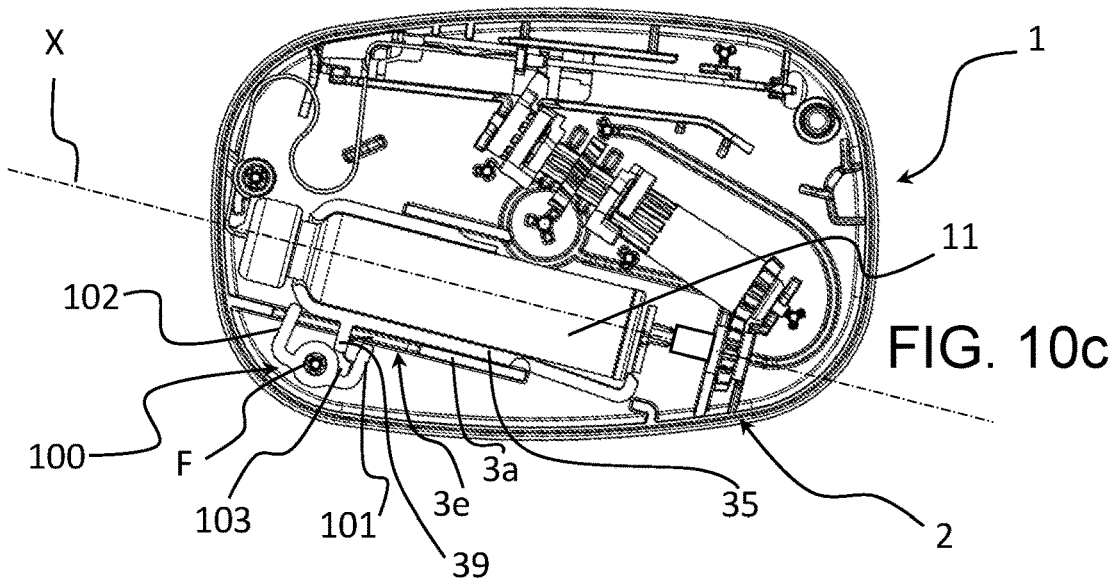

Alternatively, as for example illustrated in FIGS. 10a-10c, the aforementioned connecting members comprise a hinge element having two arms 101, 102 arranged on opposite sides with respect to a hinge axis F.

The apparatus 1 of FIGS. 10a-10c is similar to that of FIGS. 1a, 2a and 2b and differs from the latter in that it does not comprise the connecting members described above (in particular the hook portion 37 and the hook element 38).

In the embodiment of the invention of FIGS. 10a-10c, the sliding element 35 comprises a portion 39 radially projecting outwardly and the wall 3a of the main body 3 comprises an opening 3e crossed by the portion 39 of the sliding element 35.

A spring 103 is associated with an arm 101 of the hinge element.

Preferably, the hinge element is movable about the hinge axis F between a first operative position, illustrated in FIG. 10b and reachable during an initial phase of the movement of the sliding element 35 (and thus of the reservoir 11) along the axial direction A and a second operative position, illustrated in FIG. 10c and reachable during a subsequent phase of the movement of the sliding element 35 (and thus of the reservoir 11) along the axial direction A.

In said first operative position, the spring 103 is at its resting condition and an arm 102 of the hinge element is in abutment against an end portion of the sliding element 35 (or possibly of the reservoir 11).

In the aforementioned second operative position, the sliding element 35 has been moved in the axial direction pushing the arm 102 and, consequently, rotating the hinge member about the hinge axis F. This rotation compresses the spring 103 between the arm 101 of the hinge element and the portion 39 of the sliding element 35. As a result of this compression, the spring 103 pushes the portion 39 (and thus the sliding element 35 and through it the reservoir 11) along the axial direction A until the reservoir 11 abuts against the axial abutment surface 3b. The thrusting action exerted by the spring 103 on the portion 39 of the sliding element 35 maintains the abutment of the reservoir 11 on the axial abutment surface 3b during the subsequent delivery of the medicament provided inside the reservoir 11.

Obviously, in order to meet specific and contingent requirements, a person skilled in the art may make several modifications and variations to the above-described invention, all of which being within the scope of protection defined by the following claims.

What is claimed is:

1. A device for connecting a reservoir to a fluid pathway in a medicament delivery apparatus, comprising:
   a main body having a service area configured to house a needle in fluid communication with a fluid pathway;
   a reservoir extending along a longitudinal axis and housed within the main body, the reservoir being filled with a medicament to be delivered in the fluid pathway through the needle and comprising an end surface configured to be pierced by the needle and a plunger movable within the reservoir along an axial direction parallel to said longitudinal axis;
   a piston movable along said axial direction;
   wherein the device comprises a trigger mechanism configured to drive the device to move from an initial operative configuration at which the axial movement of the piston causes an axial movement of the reservoir with respect to the main body to a final operative configuration at which the axial movement of the piston causes an axial movement of the plunger within the reservoir; and
   wherein the trigger mechanism comprises a thrusting member which is engaged with the piston when the device is at said initial operative configuration and operatively disengaged from the piston when the device is at said final operative configuration.

2. The device according to claim 1, wherein the main body comprises, at the service area, an axial abutment surface and wherein when the device is at said initial operative configuration the axial movement of the piston causes the axial movement of the reservoir from a distal position with respect to said axial abutment surface to a proximal position with respect to said axial abutment surface.

3. The device according to claim 2, wherein when the reservoir is at said proximal position the reservoir abuts against said axial abutment surface.

4. The device according to claim 1, wherein the main body comprises at least one seat and the thrusting member comprises at least one pushing element arranged between the piston and the reservoir when the device is at said initial operative configuration and housed into said at least one seat when the device is at said final operative configuration.

5. The device according to claim 4, wherein said at least one seat comprises two seats arranged on opposite sides with respect to the longitudinal axis and projecting radially outwardly with respect to said main body, and wherein said at least one pushing element comprises two pushing elements arranged within the main body on opposite sides with respect to the longitudinal axis, said two pushing elements being close to each other and arranged out of said two seats when the device is at said initial operative configuration, and spaced apart from each other and locked into said two seats when the device is at said final operative configuration.

6. The device according to claim 5, wherein said at least one pushing element comprises a ring slidingly fitted onto the main body and at least one elastically bendable arm connecting the ring to a pushing element of said two pushing elements.

7. The device according to claim 4, wherein said at least one pushing element is defined at a first free end of an elastic portion of a sliding element which is arranged between the reservoir and the main body and which is axially movable together with the reservoir when the device is at said initial operative configuration.

8. The device according to claim 1, wherein said thrusting member comprises a ring connected to the piston by at least one connecting element which is configured to break when an axial force exerted by the piston on the reservoir is greater than a predetermined threshold.

9. The device according to claim 1, wherein said thrusting member comprises a ring having at least one bendable fin projecting radially inwardly from said ring and configured to bend when an axial force exerted by the piston on the reservoir is greater than a predetermined threshold.

10. The device according to claim 1, wherein the trigger mechanism comprises a thrusting member that, when the device is at said initial operative configuration, is arranged out of the reservoir between the piston and the reservoir and, when the device is at said final operative configuration, is arranged within the reservoir between the piston and the plunger.

11. The device according to claim 1, wherein the main body comprises, at the service area, an axial abutment surface and wherein when the device is at said initial operative configuration the axial movement of the piston causes the axial movement of the reservoir from a distal position with respect to said axial abutment surface to a proximal position with respect to said axial abutment surface, wherein the device further comprises connecting members configured to push the reservoir against said axial abutment surface.

12. The device according to claim 11, wherein said connecting members comprise a first magnetic element connected to the main body at said service area and a second magnetic element connected to a free end portion of the reservoir faced towards said service area.

13. The device according to claim 11, wherein at least one pushing element is defined at a first free end of an elastic portion of a sliding element which is arranged between the reservoir and the main body and which is axially movable together with the reservoir when the device is at said initial operative configuration, wherein said connecting members comprise an elastically yielding hook portion associated with one of said sliding element and said main body and a hook element associated with the other of said sliding element and said main body and configured to elastically deform said hook portion when an axial force exerted by the piston on the reservoir is greater than a predetermined threshold.

14. The device according to claim 11, wherein said connecting members comprise:
a hinge element having two arms arranged on opposite sides with respect to a hinge axis;
a sliding element fixedly coupled with the reservoir;
a spring associated with a first arm of said two arms;
wherein the hinge element is movable about the hinge axis between a first operative position at which the other of said two arms axially abuts against a first portion of the sliding element and the spring is not loaded and a second operative position at which the other of said two arms is moved away from the first portion of the sliding element and the spring has been loaded and is arranged between the first arm and a second portion of the sliding element radially projecting outwardly.

15. A device for connecting a reservoir to a fluid pathway in a medicament delivery apparatus, comprising:
a main body having a service area configured to house a needle in fluid communication with a fluid pathway;
a reservoir extending along a longitudinal axis and housed within the main body, the reservoir being filled with a medicament to be delivered in the fluid pathway through the needle and comprising an end surface configured to be pierced by the needle and a plunger movable within the reservoir along an axial direction parallel to said longitudinal axis;
a piston movable along said axial direction;
wherein the device comprises a trigger mechanism configured to drive the device to move from an initial operative configuration at which the axial movement of the piston causes an axial movement of the reservoir with respect to the main body to a final operative configuration at which the axial movement of the piston causes an axial movement of the plunger within the reservoir;
wherein the main body comprises, at the service area, an axial abutment surface and wherein when the device is at said initial operative configuration the axial movement of the piston causes the axial movement of the reservoir from a distal position with respect to said axial abutment surface to a proximal position with respect to said axial abutment surface, wherein the device further comprises connecting members configured to push the reservoir against said axial abutment surface; and
wherein said connecting members comprise a first magnetic element connected to the main body at said service area and a second magnetic element connected to a free end portion of the reservoir faced towards said service area.

16. A device for connecting a reservoir to a fluid pathway in a medicament delivery apparatus, comprising:
a main body having a service area configured to house a needle in fluid communication with a fluid pathway;
a reservoir extending along a longitudinal axis and housed within the main body, the reservoir being filled with a medicament to be delivered in the fluid pathway through the needle and comprising an end surface configured to be pierced by the needle and a plunger movable within the reservoir along an axial direction parallel to said longitudinal axis;
a piston movable along said axial direction;
wherein the device comprises a trigger mechanism configured to drive the device to move from an initial operative configuration at which the axial movement of the piston causes an axial movement of the reservoir with respect to the main body to a final operative configuration at which the axial movement of the piston causes an axial movement of the plunger within the reservoir;
wherein the main body comprises, at the service area, an axial abutment surface and wherein when the device is at said initial operative configuration the axial movement of the piston causes the axial movement of the reservoir from a distal position with respect to said axial abutment surface to a proximal position with respect to said axial abutment surface, wherein the device further comprises connecting members configured to push the reservoir against said axial abutment surface; and
wherein at least one pushing element is defined at a first free end of an elastic portion of a sliding element which is arranged between the reservoir and the main body and which is axially movable together with the reservoir when the device is at said initial operative configuration, wherein said connecting members comprise an elastically yielding hook portion associated with one of said sliding element and said main body and a hook element associated with the other of said sliding element and said main body and configured to elastically deform said hook portion when an axial force exerted by the piston on the reservoir is greater than a predetermined threshold.

\* \* \* \* \*